(12) United States Patent
Fanghaenel et al.

(10) Patent No.: US 10,691,693 B2
(45) Date of Patent: Jun. 23, 2020

(54) CACHE FOR EFFICIENT RECORD LOOKUPS IN AN LSM DATA STRUCTURE

(71) Applicant: salesforce.com, inc., San Francisco, CA (US)

(72) Inventors: Thomas Fanghaenel, Oakland, CA (US); Jameison Bear Martin, Oakland, CA (US); Nathaniel Wyatt, San Francisco, CA (US); Diego Ongaro, San Francisco, CA (US); Terry Chong, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 223 days.

(21) Appl. No.: 15/884,131

(22) Filed: Jan. 30, 2018

(65) Prior Publication Data
US 2019/0236156 A1    Aug. 1, 2019

(51) Int. Cl.
*G06F 12/0891*    (2016.01)
*G06F 16/172*    (2019.01)
(Continued)

(52) U.S. Cl.
CPC .... *G06F 16/24552* (2019.01); *G06F 12/0891* (2013.01); *G06F 16/172* (2019.01); *G06F 16/2246* (2019.01); *G06F 16/86* (2019.01); *G06F 2212/1024* (2013.01); *G06F 2212/163* (2013.01); *G06F 2212/608* (2013.01)

(58) Field of Classification Search
CPC .. G06F 16/24552; G06F 16/172; G06F 16/86; G06F 16/2246; G06F 12/0891; G06F 2212/163; G06F 2212/1024; G06F 2212/608
See application file for complete search history.

(56) References Cited

U.S. PATENT DOCUMENTS

2012/0072656 A1    3/2012    Archak et al.
2014/0325011 A1    10/2014    Guerin et al.
(Continued)

OTHER PUBLICATIONS

International Search Report and Written Opinion in Appl. No. PCT/US2019/015575 dated Mar. 28, 2019, 11 pages.
(Continued)

*Primary Examiner* — Jorge A Casanova
(74) *Attorney, Agent, or Firm* — Kowert, Hood, Munyon, Rankin & Goetzel, P.C.

(57) ABSTRACT

Techniques are disclosed relating to maintaining a cache usable to locate data stored in a data structure. A computer system, in various embodiments, maintains a data structure having a plurality of levels that store files for a database. The files may include one or more records that each have a key and corresponding data. The computer system may also maintain a cache for the database whose entries store, for a key, an indication of a location of a corresponding record in a file of the data structure. In some embodiments, the computer system receives a request to access a particular record stored in the data structure where the request specifies a key usable to locate the particular record. The computer system may retrieve, from the cache via the key, a particular indication of a location of the particular record and may use the particular indication to access the particular record.

18 Claims, 13 Drawing Sheets

(51) Int. Cl.
G06F 16/22 (2019.01)
G06F 16/2455 (2019.01)
G06F 16/84 (2019.01)

(56) References Cited

U.S. PATENT DOCUMENTS

2017/0249257 A1    8/2017  Bonnet et al.
2017/0364414 A1*  12/2017  Pogosyan ........... G06F 11/1453

OTHER PUBLICATIONS

Sears, et al., "bLSM:* A General Purpose Log Structured Merge Tree," Proceedings of the 2012 International Conference on Management of Data, May 20, 2012; pp. 217-228.
O'Neil, et al., "The Log-Structured Merge-Tree (LSM-Tree)," Acta Informatica Journal, vol. 33, Issue 4, 1996, pp. 351-385.

* cited by examiner

CACHE FOR EFFICIENT RECORD LOOKUPS IN AN LSM DATA STRUCTURE

BACKGROUND

Technical Field

This disclosure relates generally to database systems and, more specifically, to caches within database systems.

Description of the Related Art

When a business wishes to store information for their users, the business typically employs a database management system that stores the information in an organized manner that may be efficiently accessed. Such database management systems generally implement an organization scheme in which information is indexed and stored in a database as tables having rows and columns. Moreover, database management systems may be implemented through multiple servers running a database application. Such an application may process requests for information by searching tables based on a key/index value. As the amount of data grows, the time necessary to access that data grows as well.

Figure 1:
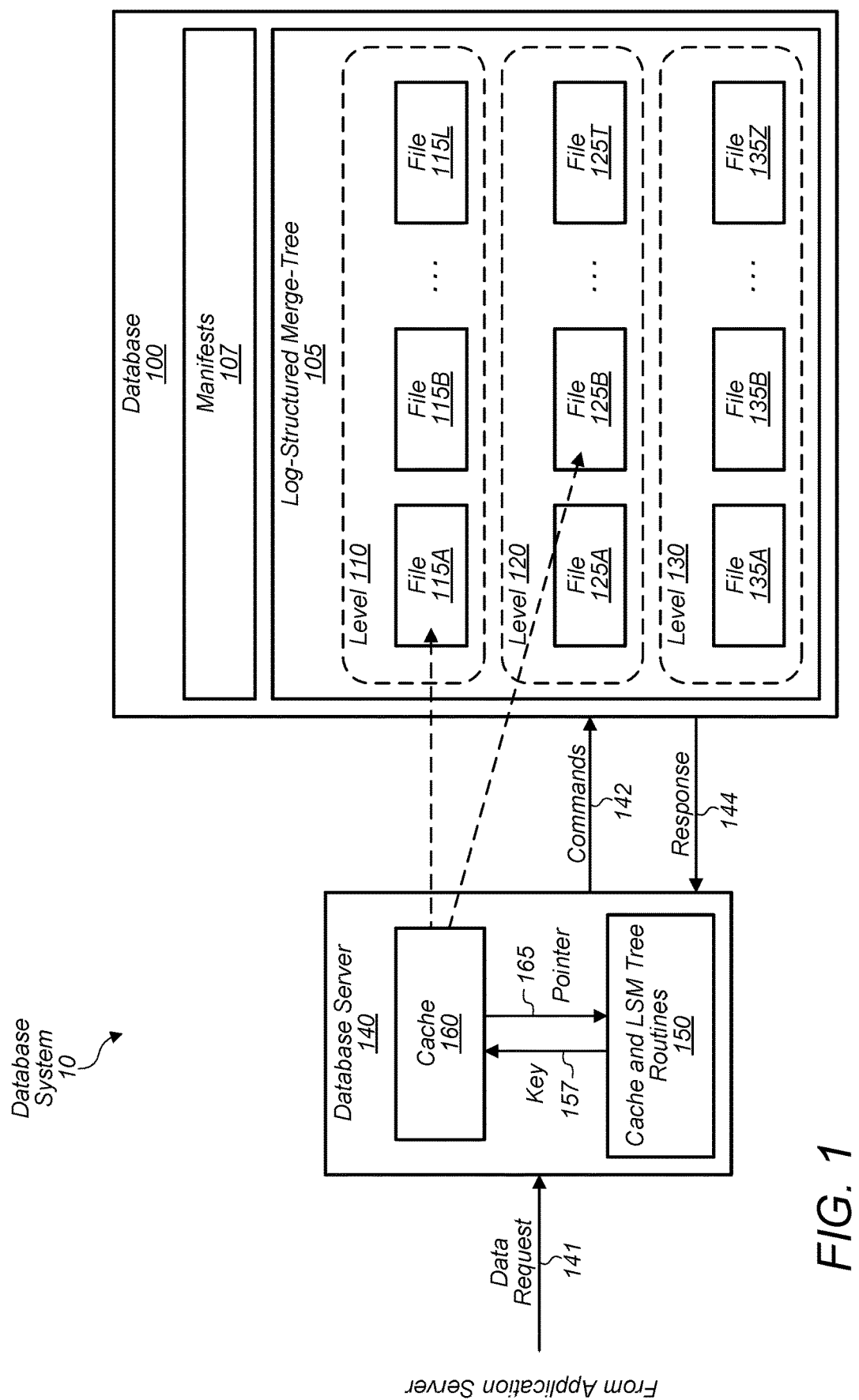
FIG. 1 is a block diagram illustrating exemplary elements of a database system that implements a database and a database server, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a database system storing nine records, the terms "first" and "second" nodes can be used to refer to any two of the nine records.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes techniques for maintaining a cache usable to locate records stored in a log-structured merge-tree. As used herein, the term "log-structured merge tree" or "LSM tree" refers to an organization scheme that includes at least a memory component and an on-disk component where data is first written to the memory component and later transferred to the on-disk component, where it is then "merged" down through levels of a data structure on the on-disk component starting from a top level. Merging may allow data as it ages to be written to slower, less expensive storage mediums. Other aspects of an LSM tree may include, based on its implementation, files that are immutable once written, varying sizes of each level (e.g., number of files) in the on-disk component, and files that include an ordered set of records. An LSM tree may allow for improved writing speeds (over structures such as B-trees) since data can be written to the root level of the on-disk component instead of having to locate and overwrite previous versions of that data.

In various embodiments described below, a database system maintains a cache that has entries that store, for a particular key, a location of a record in a log-structured merge-tree. In such embodiments, a database server included in the database system receives a request that specifies a primary key for a particular record. In various embodiments, the database server checks the cache for an entry that corresponds to the key and, if no such entry exists, then the server searches the log-structured merge-tree. After the particular record is located within the log-structured merge-tree, in some embodiments, the database server stores, in the cache and in association with the key, the location of the particular record. In various embodiments, the database server receives a request that specifies a secondary key instead of a primary key. In such embodiments, the database server may scan an index structure using the secondary key in order to locate a corresponding primary key, which the database server uses to access the corresponding record.

These techniques may be advantageous over prior approaches as records within the LSM tree may be quickly and more efficiently accessed. That is, the techniques may allow for direct-key lookups in the on-disk components of an LSM tree to be achieved in constant amortized time. Moreover, lookups involving a secondary key may be more efficient since the cost associated with a direct-key lookup (which is a component of a lookup involving a secondary key) is reduced.

Turning now to FIG. 1, a block diagram of a database system 10 is depicted. In the illustrated embodiment, database system 10 includes a database 100 and a database server 140. As shown, database 100 includes: a log-structured merge-tree 105 having levels 110, 120, and 130; and manifests 107. Also, as shown, database server 140 includes cache and LSM tree routines 150 and a cache 160. While not shown, in some embodiments, database system 10 includes multiple database servers 140 that are in communication with each other and with multiple databases 100. In embodiments in which there are multiple databases 100, the various levels (e.g., 110, 120, etc.) of tree 105 may be spread across those databases. While not shown, in various embodiments, application servers commit records to and read records from database 100 via database server 140. In some embodiments, database system 10 is implemented differently than shown—e.g., cache 160 may reside on its own server, and tree 105 may include additional levels.

Database 100, in various embodiments, is a shared storage configured to store data (e.g., records) for users of system 10. In some embodiments, database 100 is implemented by multiple storage devices that are connected together over a network (e.g., a storage attached network) and are configured to redundantly store data in order to prevent data loss. Database 100 may store data for a plurality of tenants (and their users) in a way that prevents a given tenant from accessing another tenant's data without permission. In some embodiments, database 100 processes commands 142 from database server 140 for reading data from and writing data to tree 105. Accordingly, in some embodiments, response 144 may include records from database 100, metadata (e.g., manifests 107) from database 100, acknowledgements that records have been successfully written to database 100, etc.

Log-structured merge-tree 105, in various embodiments, is a data structure storing files in an organized manner that uses a level-based scheme. Accordingly, levels 110, 120, and 130 may include a set of files having records that store data and a corresponding index (key) usable to access that data. In some embodiments, tree 105 is designed to favor writes over reads in terms of efficiency as read operations may need to consider several locations where a record may potentially exist. For example, a read operation may result in a series of searches that progress through the various levels of tree 105. In various embodiments, levels 110, 120, and 130 store differing amounts of files to improve read performance. (As shown, for example, level 110 includes files 115A-L, level 120 includes files 125A-T, and level 130 includes files 135A-Z.) The differing amounts of files in each level give tree 105 the appearance of being a tree structure in which the top level stores the least amount of files and each subsequent, lower level stores more files than the previous level. In various embodiments, new files are written to level 110 (in this case, the top level) via commands 142. Once level 110 includes a certain amount of files, in some embodiments, database system 10 performs a compaction process in which records in files of level 110 are merged or copied into the next level down, namely level 120. Database system 10 may perform this compaction process for any level when that level includes a threshold number of files or records. In doing so, database system 10 may maintain the tree structure and the improved read performance. Log-structured merge-tree 105 and the merge process are described in greater detail below with respect to FIGS. 3 and 4A-B.

Manifests 107, in various embodiments, include metadata describing tree 105 and the files included therein. In various embodiments, manifests 107 are individual snapshots of tree 105 at different points in time. That is, each manifest of manifests 107 includes metadata describing tree 105 and its levels at a given point in time. In other embodiments, manifests 107 may be a single large manifest that is rewritten when there is a change to tree 105. Additionally, in the context of a log, a particular manifest 107 may refer to a particular section of that log. In some embodiments, the creation of individual manifests 107 results from the writing of records to the top level and/or the compaction/merge process.

In some embodiments, manifests 107 specify the files included in each level of tree 105 and their corresponding key ranges. (Key ranges are discussed in greater detail with respect to FIG. 3). Accordingly, when processing a data request 141 from an application server, database server 140 may retrieve a particular manifest 107 and read it in order to determine which files may contain the requested record. That is, in various embodiments, server 140 compares a key included in data request 141 from the application server to the key ranges of the various files referenced by a given manifest 107. Files that have a key range that overlaps with the key included in the request may be searched. Manifests 107 are described in more detail below with respect to FIGS. 6A-C.

Database server 140, in various embodiments, maintains database 100 and handles requests for reading data from and writing data to database 100. Server 140 may include a set of software routines, hardware, or a combination thereof. In some embodiments, server 140 receives data requests 141 for records from application servers and communicates with database 100 to return the requested records. Likewise, server 140 may receive requests for writing records to database 100. In various embodiments, server 140 maintains database 100 (and thus tree 105) by executing routines 150.

Cache and LSM tree routines 150, in various embodiments, are a set of software routines that facilitate the maintenance of tree 105 and the processing of requests 141 from application servers. In various embodiments, routines 150 include software routines for merging (or copying) files from a given level of tree 105 into another level of tree 105. Additionally, routines 150 may include a routine for cleaning up files that remain after having had their content copied into another level of tree 105. Routines 150 may further include a routine that writes batches of records to tree 105 and invalidates entries in cache 160 corresponding to the records. In some embodiments, routines 150 spawn threads that perform these tasks (e.g., reading, writing, copying, cleaning, invalidating, etc.) defined by the software routines. In various embodiments, when searching for a particular record, routines 150 search cache 160 based on key 157 corresponding to that record. In some cases, cache 160 may provide a pointer 165 that specifies where the particular record is located in tree 105. Routines 150 are described in greater detail with respect to FIG. 2.

Cache 160, in various embodiments, is a data structure configured to store data that is usable to access records stored in tree 105. In some embodiments, cache 160 implements a key-value store in which data usable to access a particular record is returned in response to being provided a key 157 associated with that record. Tree 105, in various embodiments, is organized according to a primary key 157 (e.g., a unique row identifier). Lookups that involve a primary key 157 may include a series of O(log n) operations (e.g., identify which levels within tree 105 have key ranges that overlap with the key, and navigate to a record within a given level of tree 105). Accordingly, in various embodiments, cache 160 allows for records to be looked up without incurring the O(log n) costs. Moreover, lookups involving a secondary key 157 may also benefit from cache 160. In various embodiments, lookups that involve a secondary key 157 include 1) determining a corresponding primary key 157 by searching an index structure (e.g., B+ tree) and then 2) performing a direct-key lookup in tree 105 using the primary key 157. Accordingly, in various embodiments, cache 160 stores pointers (to records) that are accessible using primary keys 157 so that the direct-key lookup costs associated with a secondary key lookup are not incurred. Cache 160, however, may store pointers accessible using secondary keys 157 instead of primary keys 157. In various embodiments, cache 160 is populated with pointers as a result of lookups (in tree 105) that involve a given key.

In various embodiments, cache 160 stores data (e.g., pointers) identifying a location in database 100 where a given record may be stored. As explained above, tree 105 may be constantly restructuring itself as new files are written to it. Accordingly, various schemes for handling the changing nature of tree 105 may be implemented for cache 160. Two particular schemes use what is known as a location-based invariant or a value-based invariant. In the former option, cache 160 references the latest record having the latest version of particular data, while in the latter option, cache 160 references the latest version of particular data even if the record that stores the data is no longer accessible via the latest manifest 107.

Accordingly, in the location-based invariant embodiment, when a merge occurs that causes referenced data to be merged down a level, entries in cache 160 may be updated to reference the new records that store the referenced data. Accordingly, entries in cache 160 may be updated to reflect the most recent locations in tree 105 where referenced data can be found. On the other hand, in the value-based invariant embodiment, when the contents of a file are merged into a lower level within tree 105, the original file may be maintained until entries of cache 160 that reference records in that file have been invalidated. Thus, entries in cache 160 do not need to be updated each time a referenced record is merged down into another level of tree 105. Cache 160 and these two schemes are described in greater detail below with regards to FIG. 5.

Accordingly, in one implementation, database system 10 maintains a log-structured merge tree 105 having various levels (e.g., 115, 125, etc.) that each include various records storing data. In such an implementation, system 10 further includes a database server 140 having cache and LSM tree routines 150 and a cache 160. As such, upon receiving a request for a certain record within tree 105, server 140 may search the files of tree 105 to locate the record and may store an indication of its location within an entry of cache 160. Such an entry may be accessible using a primary key 157 or a secondary key 157. Upon receiving another request for that record, server 140 may use a key 157 corresponding to the record to locate its entry within cache 160. In such an implementation, server 140 retrieves the pointer 165 from cache 160 and then subsequently accesses the corresponding record. This approach may be advantageous as it allows for quicker and more efficient look-ups of records within system 10. That is, instead of incurring the cost of a direct-key lookup, server 140 may quickly identify where a record is located by retrieving information pointing to its location from cache 160.

As explained above, routines 150, in various embodiments, include a set of software routines to perform various tasks associated with maintaining and accessing cache 160. Examples of these software routines are now discussed in greater detail with reference to FIG. 2.

Figure 2:
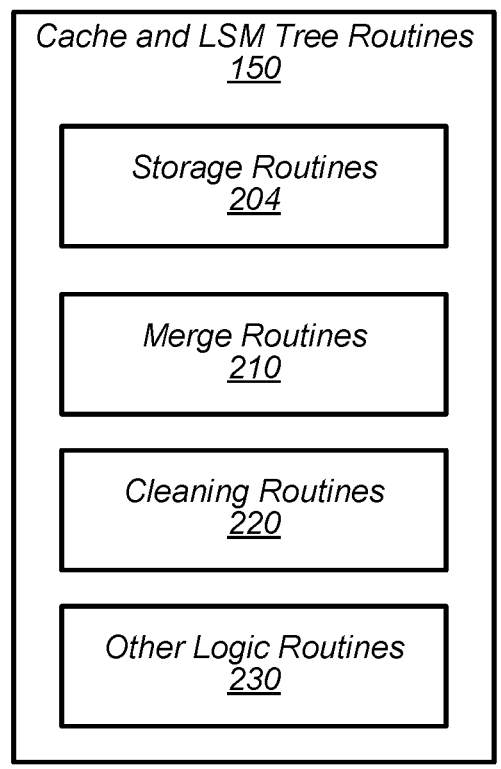
FIG. 2 is a block diagram illustrating exemplary elements of routines that performs various functions, according to some embodiments.

Turning now to FIG. 2, a block diagram of routines 150 is depicted. As mentioned above, routines 150 may handle the maintenance of tree 105 and cache 160. In the illustrated embodiment, routines 150 include various routines, including storage routines 204, merge routines 210, cleaning routines 220, and other logic routines 230. In some embodiments, routines 150 may be implemented differently than shown. For example, routines 204, 210, 220, or 230 may be implemented entirely in hardware.

Storage routines 204, in various embodiments, are a set of routines executable to populate and/or invalidate entries in cache 160. As such, when populating or invalidating an entry, routines 210, 220, and 230 may invoke (directly or indirectly) storage routines 204 in order to populate or invalidate that entry in cache 160. Storage routines 204 may be, for example, an open-source program such as REDIS.

Merge routines 210, in various embodiments, are a set of software routines executable to carry out the compaction process to merge records from one level of tree 105 into another level of tree 105. In some embodiments, merge routines 210 are further executable to invalidate entries in cache 160 that are associated with records affected by a merge. As mentioned above, at a given point in time, a level of tree 105 may store more records than is desired for that level. Accordingly, in some embodiments, merge routines 210 are executed to merge records into another level capable of storing more records than the level from which they were taken. In various embodiments, merging records into another level includes copying their contents into new files. In some embodiments, a key range is used to determine which records are to be merged into the next level. In some cases, merging includes copying the records (that overlap with the key range) already in the next level into the new files such that new files include records from a higher level and the same level in which the new files reside. In various embodiments, executing merge routines 210 results in the original records remaining in a given level after their contents are merged into another level. Thus, in some embodiments, routines 150 perform a clean-up process to remove the leftover records.

Cleaning routines 220, in various embodiments, are a set of software routines executable to handle removal of files leftover from the compaction process. As noted above, files may be maintained after being merged until cache 160 no longer references records within those files. Accordingly, in various embodiments, cleaning routines 220 are executable to ensure that cache 160 do not contain any entries for a file before that file is completely removed. Thus, cleaning routines 220 may invalidate entries in cache 160 that are associated with files being removed. In various embodiments, routines 220 further ensure that there are no threads that may still be actively working with information that they obtained just prior to invalidation. In some embodiments, routines 220 determines whether there are in-progress threads using manifests 107. In such embodiments, an in-progress thread may be associated with a certain manifest 107 such that the invalidation of that manifest is indicative of the in-progress thread ceasing to exist. This is described in greater detail with regards to FIG. 7. After determining that no entries in cache 160 reference a particular file and that no in-progress threads are capable of accessing that file, in various embodiments, routines 220 remove that particular file. In some embodiments, routines 220 include a clean-up queue that indicates files to be removed. Files may be added to the clean-up queue after they are no longer referenced by the current manifests 107 (e.g., manifests 107 that have not expired).

Other logic routines 230, in various embodiments, include software routines that facilitate the processing of data requests from application servers. Data requests may include writing records to and reading records from a local in-memory buffer of server 140 or to and from tree 105 (if the requested record is not in the in-memory buffer). In some embodiments, other logic routines 230 write records to the in-memory buffer before writing their contents to tree 105. That is, after accumulating a number of records, other logic routines 230 may write the records to the top level (e.g., level 110) of tree 105 as a file 115. In various embodiments, writing records to the top level of tree 105 triggers the compaction process as the top level may now contain more files or records than it should. After writing the accumulated records to tree 105 (or prior to writing them to tree 105), in various embodiments, other logic routines 230 invalidate entries in cache 160 having keys corresponding to those included in the records written to tree 105.

Accordingly, the execution of routines 204, 210, 220, and 230 may allow for server 140 to maintain tree 105 by writing records to tree 105 and subsequently merging those records down through levels of tree 105. Moreover, the execution of routines 204, 210, 220, and 230 may allow for server 140 to maintain cache 160 such that it is ensured that valid entries in cache 160 point to records that exist despite the changing nature of tree 105.

Figure 3:
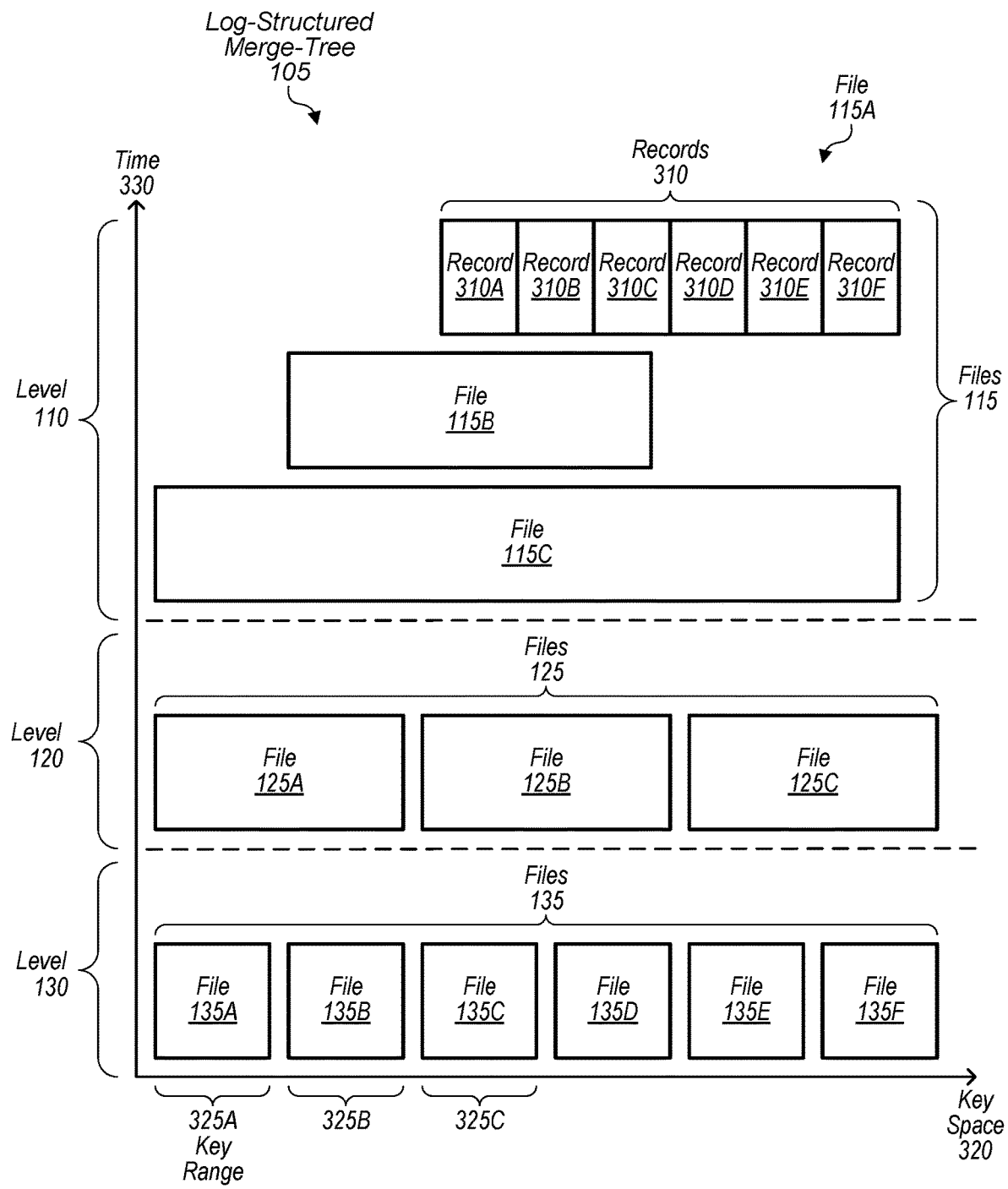
FIG. 3 is a block diagram illustrating exemplary elements of a log-structured merge-tree, according to some embodiments.
Figure 4A:
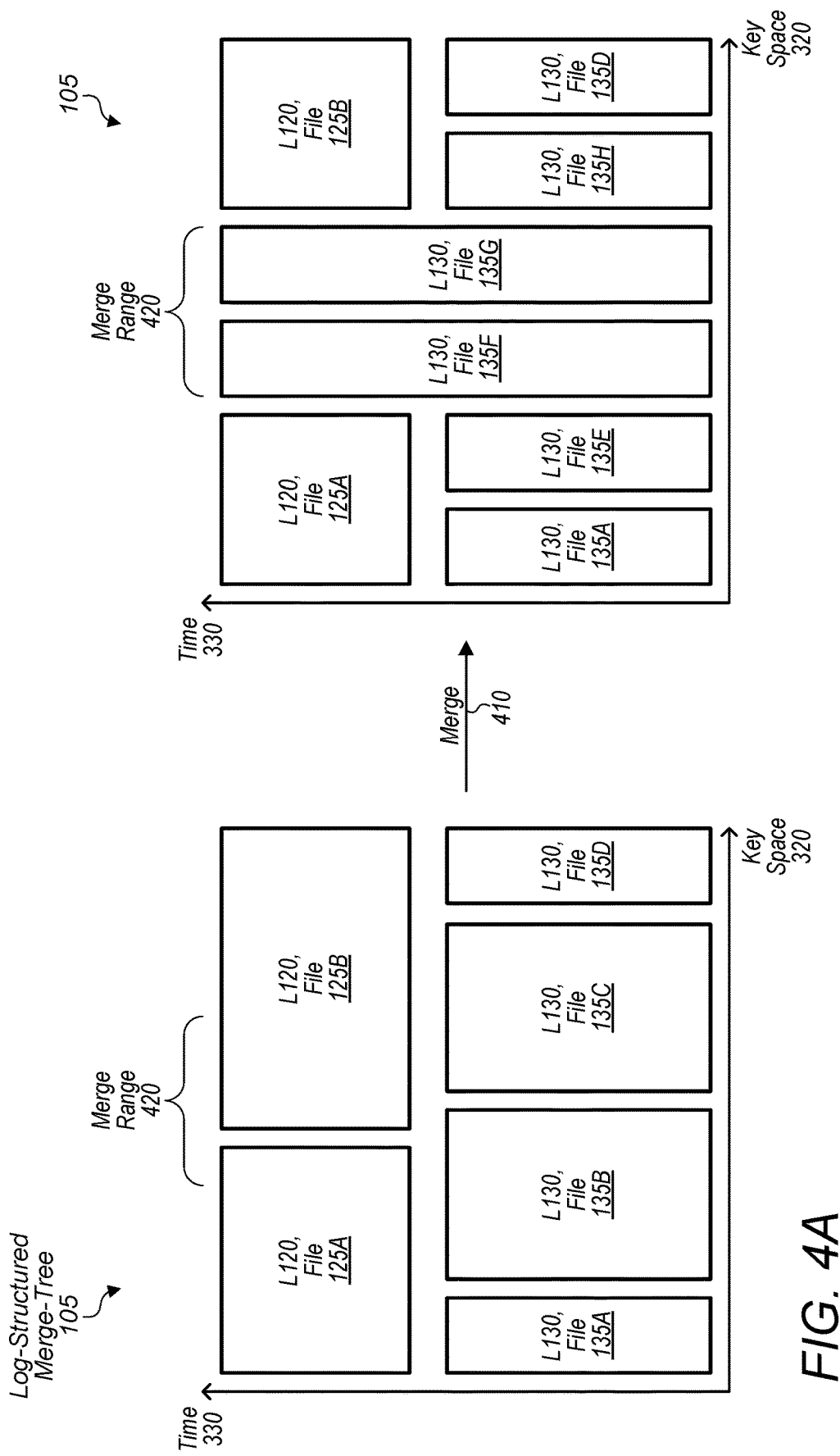
FIG. 4A-B is a block diagram illustrating exemplary elements of merge procedures, according to some embodiments.
Figure 4B:
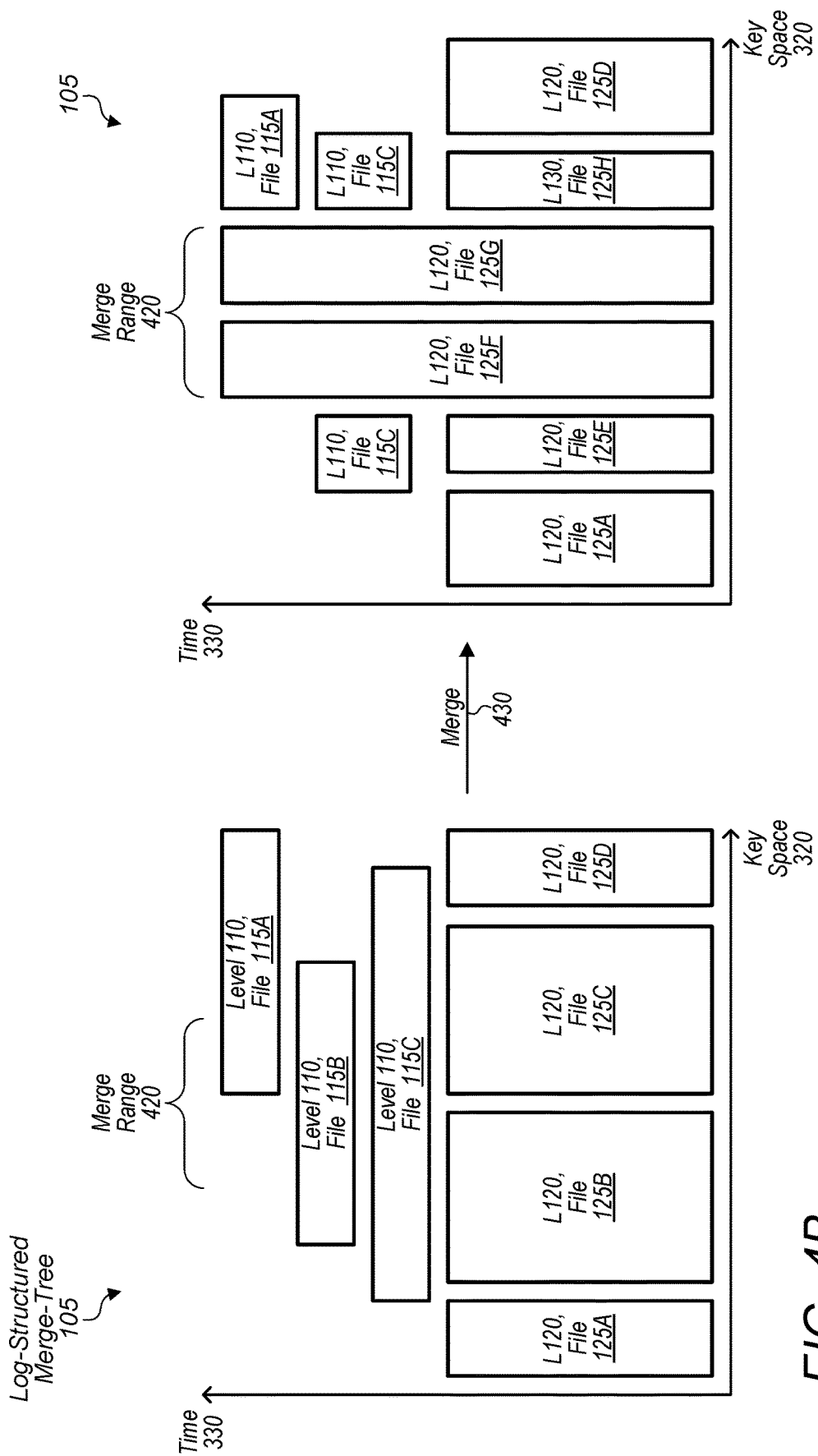

Before delving into cache 160 further, the description accompanying FIGS. 3, 4A, and 4B provide foundation for certain aspects of cache 160. FIG. 3 and its description first detail an exemplary organization scheme for tree 105, including the records stored within levels of tree 105. Then, the text accompanying FIGS. 4A and 4B describes exemplary procedures for merging records from one level to another within a data structure such as tree 105.

Turning now to FIG. 3, a block diagram of the organization of log-structured merge-tree 105 is depicted. As mentioned above, tree 105 may be a data structure storing files in an organized manner that uses a level-based scheme. In the illustrated embodiment, tree 105 includes: a level 110 having files 115A-C; a level 120 having files 125A-C; and a level 130 having files 135A-F. Also as shown, file 115A includes records 310, including records 310A-F. In the illustrated embodiment, files 115, 125, and 135 are placed along an x-axis representative of a key space 320 and a y-axis representative of time 330. While not shown, in some embodiments, files in one level include records that overlap in time 330 with other records in files of another level. In various embodiments, log-structured merge-tree 105 may be implemented differently than shown—e.g., each level in tree 105 may include the same number of files.

Records 310, in various embodiments, are data items that are each associated with a particular key usable to access that data item. For example, a database table may include columns for a company name, street address, and email. Accordingly, a record 310A may be representative of a row in that table and may include a particular company's name, street address, and email. In various embodiments, records 310 may each include a timestamp, a key (e.g., a unique value stored in each row), and a payload (e.g., data values). In various embodiments, a given record 310's key is usable to index that record and to locate it within tree 105. In some embodiments, a given record 310 is associated with more than one key and thus is accessible through more than one key (e.g., a secondary key).

In various embodiments, records 310 are immutable such that once they are written, they cannot be modified. Accordingly, in such embodiments, changes to data specified by a given record 310 result in a new record 310 being created. Consider for example, a record 310 that stores a username "Bob." If the username is updated to "Bill," then a new record 310 is created instead of modifying the record that stores "Bob." As such, records 310 may be representative of changes to rows in a database table. In various embodiments, records 310 are associated with database operations (e.g., INSERT, DELETE, and UPDATE) that affect the data stored at database 100. In various embodiments, records 310 are initially created and stored in an in-memory buffer at database server 140 until an accumulation of records 310 occurs in that buffer. Once there is an accumulation of records 310 in the buffer, then server 140 may write records 310 to tree 105 as files 115. As such, in various embodiments, files 115, 125, 135, etc. are a collection/grouping of records 310 that were written at various times during the operation of database system 10.

Key space 320, in various embodiments, is a range of keys that includes all the keys used to index records 310 within tree 105. As explained above, individual records 310 may include a unique key that identifies that record 310. Accordingly, in various embodiments, files 115, 125, 135, etc. are each associated with a range of keys defined by the various records 310 that they contain. When records 310 are written to a given file, in some embodiments, they are written as an ordered set such that the first and last records 310 in that file define the key range for that file. As shown for example, files 135A-C are each associated with a key range 325A-C, respectively. In various embodiments, each level within tree 105 (e.g., levels 120, 130, etc.) except level 110 includes no overlapping key ranges. Additionally, in such embodiments, manifests 107 may include information that specifies the key ranges for each file within a given level. Accordingly, when searching for a particular record 310, database server 140 may consult manifests 107 and may search only one file within each level (except level 110) as the key ranges may not overlap. In various embodiments, when the compaction process is performed, system 10 maintains non-overlapping files in levels 120, 130, etc. This is described in greater detail with regards to FIGS. 4A-B.

Time 330, in various embodiments, represents a progression of time associated with the operation of system 10. In the illustrated embodiments, moving down the axis of time 330 represents a movement back in time. That is, older records 310 may be found in lower levels of tree 105. Accordingly, in various embodiments, when searching tree 105 for data, records 310 within upper levels (e.g., level 110) may be searched before lower levels (e.g., level 130) as records 310 within upper levels are newer and thus may include newer values for the data. In various embodiments, files 115, 125, 135, etc. are each associated with a particular time 330 bound defined by the records 310 that they contain. While not shown, in some embodiments, files 115, 125, 135, etc. may overlap in time 330 across levels. For example, file 125A may include records 310 that were roughly created at the same time as records 310 within file 135C.

Accordingly, database server 140 may maintain tree 105 such that each level within tree 105 (except level 110) includes records 310 that do not overlap in key space 320 and are relatively close in time 330. In maintaining tree 105 in this manner, records 310 may be located more efficiently as newer records 310 are closer to the top level of tree 105 and only one file in each level (with the exception of level 110) needs to be searched for a given record 310 since key ranges 325 do not overlap in key space 320.

Tree 105 is thus a data structure in which records are periodically moved to different levels of the tree. FIGS. 4A and 4B, described next, depict two different such scenarios.

Turning now to FIG. 4A, a block diagram of a merge procedure in which the content of files is merged from one level to another is depicted. As explained above, once a given level in tree 105 includes a certain amount of files, database system 10 may write records 310 in those files to new files in the next level of tree 105. In the illustrated embodiment, two versions of tree 105 are shown—e.g., a before and after merge 410. As shown in the before merge 410 version (depicted on the left), tree 105 includes a level 120 having files 125A-B and a level 130 having files 135A-D. As shown in the after merge 410 version (depicted on the right), tree 105 includes a level 120 having a subset of files 125A-B and a level 130 having files 135A and 135D-H. Note that files 135E and 135H may also be considered to be files 135B and 135C; however, the new manifest created by merge 410 restricts the key ranges for which files 135B and 135C are valid. As depicted and discussed with regards to FIG. 4A, merge 410 may be performed to merge records in files 125 of level 120 into new files 135 of level 130. In various embodiments, the merge procedure is implemented differently based on the level being merged down as is discussed with regards to FIG. 4B. In various embodiments, merge 410 is performed as a result of the execution of merge routines 210.

Merge 410, in various embodiments, is a procedure for merging records 310 of one level (e.g., level 120) with records 310 of another level (e.g., level 130). As such, in various embodiments, merge 410 results in the creation of new files having records 310 from both levels (e.g., level 120 and 130). In some embodiments, merge 410 is performed in response to the number of files in a given level exceeding a threshold amount. In other embodiments, merge 410 is performed based on a time scheme in which database server 140 periodically merges records 310. In yet other embodiments, merge 410 is continually performed absent a trigger mechanism—e.g., server 140 continually merges records 310 as long as there are records 310. In various embodiments, server 140 determines which records 310 to merge based on a merge range 420.

Merge range 420, in various embodiments, is information defining a range of keys usable to select the particular records 310 that are to be merged from two or more different levels 110, 120, 130 etc. within tree 105. In some embodiments, the number of keys within range 420 are specified by a user of system 10. In other embodiments, the number of keys within range 420 dynamically changes (e.g., increases or decreases) based on the urgency of merging records 310. For example, more records 310 may need to be merged if there is a high volume of writes to database 100 and thus range 420 may be wider that it otherwise would be. In various embodiments, range 420 is shifted after each merge 410 such that the new range 420 starts where the last range 420 stopped (e.g., starts with the next key in key space 320). Accordingly, upon reaching the last key in key space 320, key range 420 may loop/circle back to the beginning key in key space 320. In some embodiments, range 420 specifies a range of keys based on a selected file such that merge 410 merges all the records 310 in that file in one merge.

In various embodiments, merge 410 selects records 310 from the two or more levels involved in merge 410 and that fall within merge range 420. As shown for example, range 420 includes records 310 from files 125A, 125B, 135B, and 135C. Accordingly, database server 140 may write the particular records 310 that fall within merge range 420 into new files. In some embodiments, server 140 writes all the records 310 included in a file (in the level being merged into) when that file falls within range 420. For example, all the records 310 within file 135B may be written to new files since part of file 135B falls within range 420. In various embodiments, records 310 are written into new files as an ordered set that is based on keys associated with those records. In various embodiments, server 140 writes records 310 into a new file until that file reaches a particular size at which point server 140 may writes the remaining records into another new file. That is, files 115, 125, 135, etc. in tree 105 may be kept under a certain size (e.g., 2 Megabytes) and thus merging records 310 may result in multiple new files being created. As shown for example, merge 410 results in the creation of files 135E-H.

In various embodiments, database system 10 maintains the original files 115, 125, 135, etc. whose records 310 have been merged down a level within tree 105. Accordingly, in some embodiments, as merge 410 is performed, database server 140 updates manifests 107 to indicate that particular records 310 within a given file have been merged. That is, new manifests 107 may be generated that specify, for a given file, a key range 325 that excludes the records 310 in that file that have been merged. In some embodiments, server 140 updates a file to reflect that particular records 310 within that file have been merged—e.g., appends a key range associated with the records 310 that have been merged. In various embodiments, merge 410 results in a set of records 310 within a given file being merged and thus may be performed multiple times before that file is completely merged. Once a file has been completely merged, system 10 may perform the file in a clean-up queue and then perform a clean-up process to remove that file. Accordingly, the original files 115, 125, 135, etc. may be maintained for only a limited period of time.

Turning now to FIG. 4B, a block diagram of a merge procedure in which the content of files is merged from one level to another is depicted. In the illustrated embodiment, two versions of tree 105 are shown—e.g., a before and after merge 430. As shown in the before merge 430 version (depicted on the left), tree 105 includes a level 110 having files 115A-C and a level 120 having files 125A-D. As shown in the after merge 410 version (depicted on the right), tree 105 includes a level 110 having a subset of files 125A and 125C and a level 120 having files 135A and 135D-H. As depicted and discussed with regards to FIG. 4B, merge 410 may be performed to merge records in files 115 of level 110 into new files 125 of level 120. Merge 430 may be performed as a result of the execution of merge routines 210.

In various embodiments, level 110 (i.e. the top level of tree 105) includes a unique property with respect to the other levels (e.g., 120, 130, etc.) in tree 105 in that it includes files that have overlapping key ranges 325. As shown for example, files 115A-C overlap in key space 320 whereas files 125A-D do not. Accordingly, in some embodiments, merge 430 differs from merge 410 in that merge 430 handles overlapping files 115. That is, merge 430 may represent a unique case in which files are merged from the top level (e.g., level 110) of tree 105 into the next level of tree 105 (e.g., 120). As such, merge 430 may select records 310 from multiple files in the same level that overlap in key space 320 and then may merge them down into the next level of tree 105.

Accordingly, merge 410 and 430 may ensure that levels 110, 120, 130, etc. within tree 105 do not grow beyond a particular size set for that level. In doing so, merge 410 and 430 may keep data retrieval times low when accessing data from tree 105. Merge 410 and 430, however, result in records 310 being merged from one level to another within tree 105.

Having described the structure of tree 105 and the merging of data from one level of the tree to another, cache 160 is now discussed with reference to FIG. 5, including two different invariant schemes for handling the changing nature of tree 105.

Figure 5:
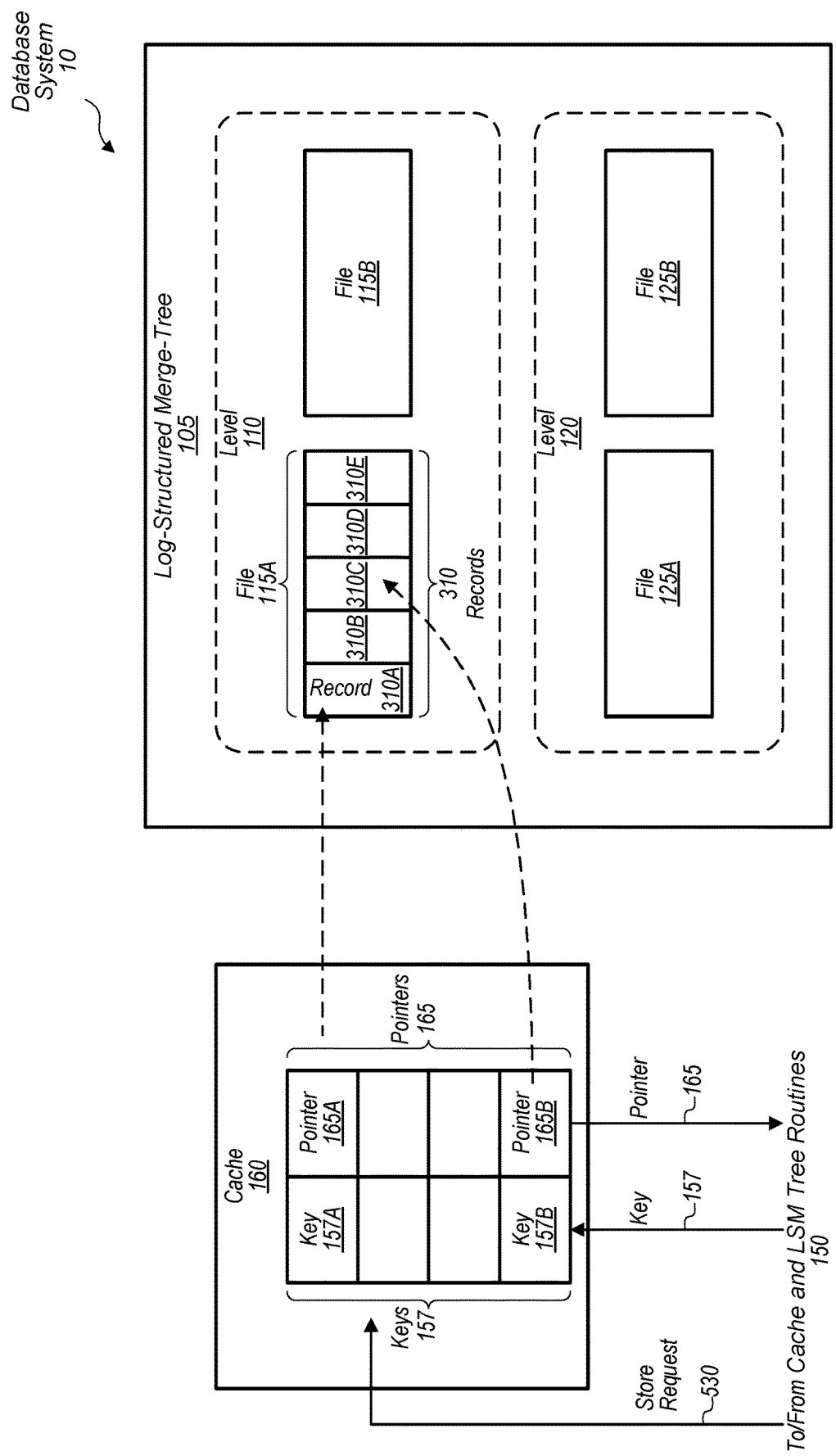
FIG. 5 is a block diagram illustrating exemplary elements of a cache, according to some embodiments.

Turning now to FIG. 5, a block diagram of a cache 160 is depicted. In the illustrated embodiment, cache 160 includes keys 157A-B and corresponding pointers 165A-B that indicate records 310A and 310C within a file 115A of log-structured merge tree 105. While not shown, pointers 165 may indicate records 310 within any of the files (e.g., files 115A-B, files 125A-B, etc.) within tree 105. In some embodiments, cache 160 may be implemented differently than shown. For example, pointers 165 may indicate files (e.g., files 115, 125, 135, etc.) instead of individual records 310.

Cache 160, in various embodiments, is a data structure configured to store data that is usable to access records 310 that are stored in tree 105. Cache 160 may be implemented via software routines, hardware, or any combination thereof. As mentioned above, cache 160 may implement a key-value store. In some embodiments, keys 157 are identifiers (in some cases, unique) usable to identify records 310 to which they correspond. Accordingly, when searching for a particular record 310 in tree 105, database server 140 may compare a provided key 157 against keys 157 in each record within tree 105 that is searched until the particular record 310 is discovered. Once the particular record 310 is discovered, server 140 may store a pointer 165 in association with that record 310. In some embodiments, pointers 165 each provide an indication of a location where a corresponding record 310 may be found in tree 105. In some embodiments, pointers 165 specify a file name (or file address) and an offset in that file where the corresponding record 310 may be found. As such, server 140 may use pointers 165 to more quickly locate records than searching tree 105.

In various embodiments, cache 160 is populated with entries as a result of searching tree 105 and locating records 310. Once a particular record 310 is located within tree 105, in some embodiments, routines 150 make a store request 530 to store, for the corresponding key 157, a pointer 165 that indicates where that record 310 is located within tree 105.

Accordingly, when receiving a request for a record 310, routines 150 may provide the particular key 157 included in the request to cache 160. As a result, cache 160 may return a pointer 165 to the corresponding record 310. In some embodiments, keys 157 are hashed (and possibly truncated to be a value within the number of entries supported by cache 160) to derive an index value at which a particular pointer 165 may be stored. Accordingly, in various embodiments, cache 160 does not store keys 157. This may allow for atomic updates to entries of cache 160 and may also reduce the memory size of cache 160. In various cases, two or more keys 157 may hash to the same particular index. Thus, in some embodiments, when storing a new pointer 165 whose corresponding key 157 hashes to an index where another pointer 165 is stored, the new pointer 165 is stored instead of the other, older pointer 165. That is, in embodiments in which keys 157 collide for a given entry in cache 160, that given entry may be overwritten with the new pointer 165. Accordingly, when receiving a pointer 165 from cache 160, routines 150 may check the particular record 310 to see if its key matches. If the key does not match, then routines 150 were provided a pointer 165 that may have been the subject of a key collision. As previously noted, cache 160 may be implemented using a value-based invariant or a location-based invariant. While these invariants are discussed below, other invariants may be used to implement cache 160.

In various embodiments, cache 160 implements the value-based invariant approach in which pointers 165 provide locations of or indicate current or non-current records 310 storing the latest version of the particular data. As used herein, the term "current record," relative to some particular data, refers to the latest created record that stores the particular data, while the term "non-current record" refers to a record that stores the same particular data, but is not the latest created one. For example, a particular record 310 initially written to the top level of tree 105 is the current record for its data. When that record 310 is copied to the next level of tree 105, the copy of that record 310 becomes the current record whereas the particular record 310 in the top level that was copied becomes a non-current record. That is, each time a record 310 is copied to the next level of tree 105, then the copy becomes the current record. Accordingly, in the embodiments in which a value-based invariant is used, cache 160 includes pointers 165 that indicate particular records 310 irrespective of whether those records 310 are current or non-current. That is, as long as the particular data being pointed to has not been modified, pointers 165 do not need to be updated to point to the current record 310 in the event of merge 410 or 430. As mentioned above, copying records 310 from one level to another may not change their contents. Thus, in some embodiments, pointers 165 of cache 160 are not invalidated in response to records 310 being merged (or copied) into another level of tree 105. In some embodiments, pointers 165 are invalidated in response to the data that they point to being updated and stored as a new record 310—e.g., server 140 performs an UPDATE operation that modifies a row within a table where the row corresponds to the particular record 310 being pointed to by a pointer 165. In some embodiments, pointers 165 are progressively invalidated in response to their corresponding file is no longer being referenced by any of the manifests 107. That is, if none of the manifests 107 reference that file, then that file may not be accessed through manifests 107 and thus no new pointers 165 may be added to cache 160 that point to that file. Accordingly, server 140 may begin invalidating entries without worrying that new pointers 165 that point to that file will be added. In some embodiments, invalidating pointers 165 is prioritized based on a need to recycle aliases.

In various embodiments, aliases are values that may be used in substitution of file names. In some embodiments, pointers 165 specify a file name along with an offset in that file where a particular record may be located. In some cases, however, the file name may be too long to store in cache 160. In particular, in various embodiments, cache 160 includes entries that are limited in size so as to allow for pointers 165 to be stored in those entries using atomic store instructions. As such, in various embodiments, cache 160 uses aliases instead of file names. That is, instead of pointer 165 specifying a file name, it may specify an alias since aliases may be shorter in length—e.g., an alias may be a 16-bit number as opposed to a 64-bit number. In various embodiments, system 10 maintains a map of aliases to file names. Accordingly, in response to retrieving a pointer 165 from cache 160, server 140 may convert the alias of that pointer to a file name, which it uses to get at the record in the associated file. In various embodiments, system 10 ensures that if an alias is in the cache, there will be an entry in the map. Additionally, in some embodiments, system 10 maintains a limited number of aliases. As such, system 10 may need to recycle an alias in order to use it for another file. Thus, in various embodiments, after a file is no longer referenced by a manifest 107, system 10 invalidates entries in cache 160 that are associated with the alias that is being recycled. After cache 160 no longer includes an entry associated with that alias, then the mapping between the alias and the file associated with that alias may be removed, recycling the alias.

In some embodiments, cache 160 implements the location-based invariant approach in which pointers 165 provide locations of or indicate current records 310 storing the latest version of particular data. Like the other invariant, pointers 165 may be invalidated in response to records 310 having the same corresponding keys 157 being flushed from the in-memory buffer to tree 105, as the flush may indicate that the pointed-to-data has been modified. In some embodiments, pointers 165 are invalidated or updated in response to the pointed-to-data being merged/copied into another level of tree 105. Additionally, pointers 165 may be invalidated based on a need to recycle aliases. The location-based invariant is described in greater detail below with regards to FIG. 8.

In both invariant approaches, when records are flushed from an in-memory buffer and written as a file 115 in LSM tree 105, in various embodiments, particular entries within cache 160 are invalidated. In particular, the entries that correspond to the keys 157 of the records being added to LSM tree 105 are invalidated. In various embodiments, cache population by threads is prevented between the start of the cache invalidation and the time that a new manifest 107 created by the flush operation becomes available. In particular, in such embodiments, threads that are operating, during that time, on an older manifest 107 (i.e., the manifest 107 that will be replaced with the new manifest 107) are prevented from populating cache 160 to ensure that no thread populates cache 160 with records that will no longer be cacheable with the publishing of the new manifest 107, which changes the set of cacheable records.

Accordingly, while other invariants may be possible, in implementing the location-based invariant or the value-based invariant, it may be ensured that entries (which are valid) within cache 160 store pointers 165 that point to records 310 that exist within tree 105. As mentioned earlier, in the value-based invariant, cache 160 may include pointers 165 that indicate records 310 in files that have been completely merged as a result of merge 410 or 430. While system 10 may maintain a particular file (which has been completely merged) for some time, it may be desirable to remove that file. Thus, in some embodiments, system 10 performs a clean-up process to invalidate entries in cache 160 and to remove the desired file (e.g., database server 140 executes cleaning routines 220). Before describing how this may be performed, the concept of manifests 107 is described further with reference to FIGS. 6A-6C, since manifests play a role in the exemplary cleaning procedure discussed in FIG. 7.

Figure 6:
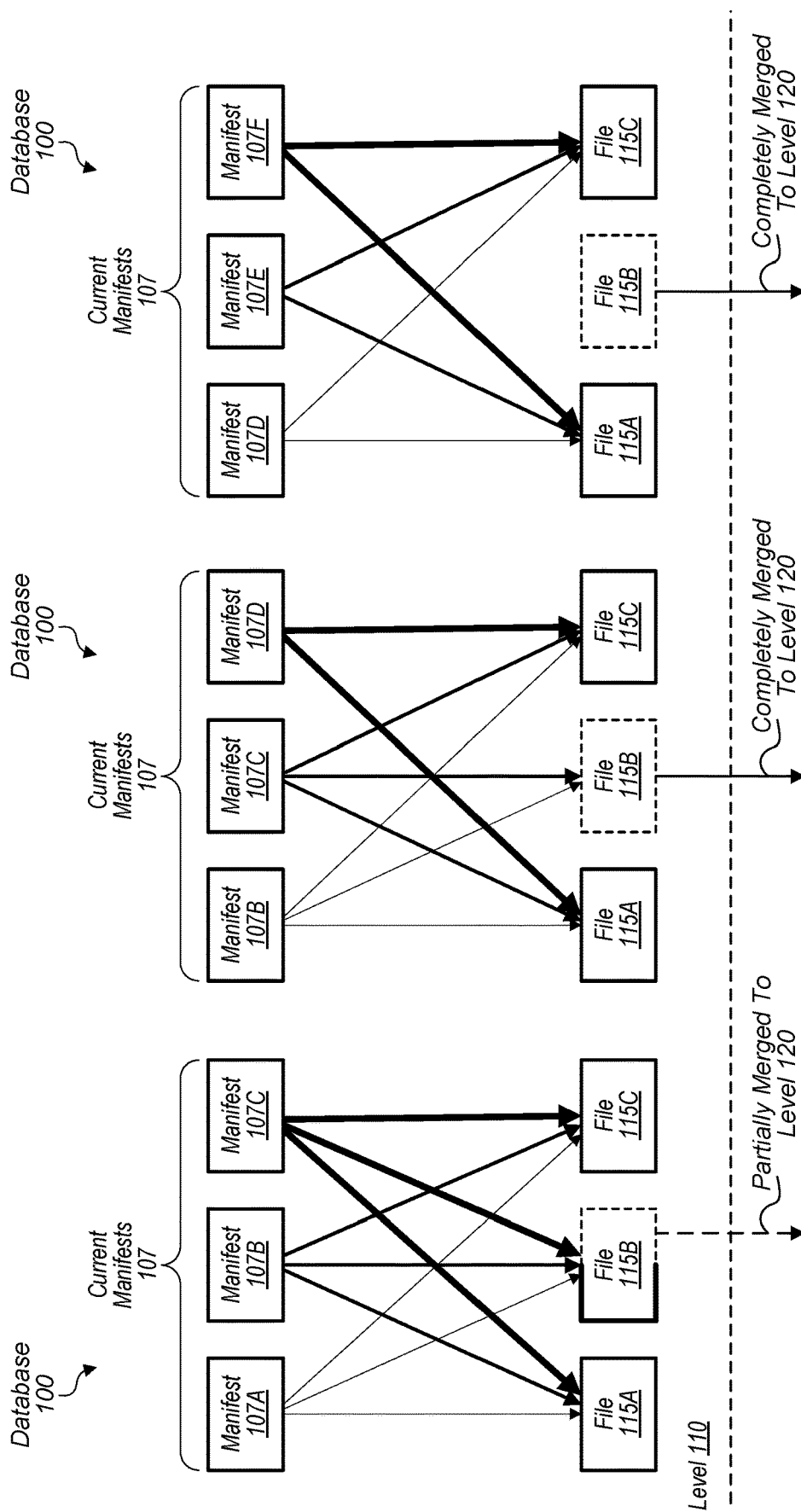
FIG. 6A-C is a block diagram illustrating exemplary elements of a set of manifests, according to some embodiments.

Turning now to FIG. 6A, a block diagram of a set of manifests 107 is shown. In the illustrated embodiment, database 100 includes manifests 107A-C that reference files 115A-C. As mentioned earlier, manifests 107 may be individual files (or a single file) that specify snapshots of tree 105 at different points in time. Accordingly, manifest 107A may represent the earliest, valid (e.g., still in use) snapshot of tree 105 whereas manifests 107B and 107C may represent progressively later snapshots of tree 105. As further shown in FIG. 6A, file 115B has been partially merged into another level of tree 105 (indicated by the box of file 115B having dashed lines for part of the box). Accordingly, as shown in FIGS. 6B and 6C, file 115B has been completely merged (indicated by the box of file 115B being completely dashed lines).

When searching for a particular record 310, in some embodiments, database server 140 reads manifests 107 to determine possible locations where that record may be located within tree 105. In particular, in various embodiments, threads implementing routines 150 receive requests for particular records 310 within tree 105. In such embodiments, these threads may be associated with a particular manifest 107 that they consult throughout their lifespan. Consider an example in which two threads are spawned at different points during the operation of system 10. In such an example, one of the two threads may be associated with manifest 107A whereas the other thread may be associated with manifest 107B. As such, when the first thread receives a request for a record 310, it may read manifest 107A instead of manifest 107B (or 107C). As such, whether a given thread has access to a record 310 in a particular file may depend on when it was spawned since its corresponding manifest 107 may not reference that record with that file.

Turning now to FIG. 6B, a block diagram of a set of manifests 107 is shown. In the illustrated embodiment, database 100 includes manifests 107B-D. As depicted, manifests 107B and 107C reference files 115A-C; however, manifest 107D references files 115A and 115C, but not file 115B. FIG. 6B represents a later time during the operation of system 10 as opposed to FIG. 6A. As shown by the differences between FIGS. 6A and 6B, manifest 107D has been added and manifest 107A has expired.

In various embodiments, manifests 107 are created in response to records 310 being flushed from an in-memory buffer of database server 140 and written to tree 105 as a file 115. In various embodiments, manifests 107 are created in response to merge 410 or 430 being performed. As shown in the illustrated embodiment, the contents of file 115B have been completely merged/copied into another level of tree 105. As such, manifest 107D may be created in response to the contents of file 115B being completely merged. As noted above, threads implementing routines 150 may be associated with a particular manifest 107. Thus, a particular thread may be associated with manifest 107D. Accordingly, that thread may not access file 115B through manifest 107D; however, it may access file 115B through cache 160 as long as that file exists and is referenced by pointers 165 that are stored at cache 160. Other threads that are associated with manifests 107B and 107C, however, may access file 115B through those manifests.

Turning now to FIG. 6C, a block diagram of a set of manifests 107 is shown. In the illustrated embodiment, database 100 includes manifests 107D-F. As depicted, manifests 107D-F reference files 115A and 115C; however, none of these manifests 107 reference file 115B. FIG. 6C represents a later time during the operation of system 10 as opposed to FIGS. 6A and 6B. As shown by the differences between FIG. 6C and FIGS. 6A and 6B, manifests 107E and 107F have been added and manifests 107B and 107C have expired.

In various embodiments, a manifest 107 expires when it is not the latest manifest 107 and when no threads reference it. In particular, when a thread needs to access tree 105, it may acquire a reference to the latest manifest 107. When the thread is done accessing tree 105, it may release the reference. If the same thread needs to subsequently access tree 105, in some embodiments, it receives a new reference to whatever manifest 107 is the latest. (Note that a thread may reference different manifests 107 throughout its existence). In some embodiments, manifests 107 expire based on the associated threads (that implement routines 150) ceasing to exist. That is, when threads are spawned, they may be associated with a particular manifest 107 of database 100. Accordingly, when a newer manifest 107 is created, threads that are subsequently spawned may be associated with that newer manifest 107. Thus, it might be the case that at a certain point in time, no more newly spawned threads may be associated with the older manifest 107. Thus, when the threads that are associated with older manifest 107 have terminated, then no threads will being reading that manifest 107 and thus it may expire (e.g., archived or deleted). In other embodiments, older manifests 107 expire after a threshold amount of manifests 107 has been reached or surpassed. In yet other embodiments, manifests 107 expire based on some defined amount of time passing. In various embodiments, when no manifests 107 reference a given file, then that file may be placed in a clean-up queue and subsequently removed. For example, since no manifests 107 reference file 115B at the point in time associated with FIG. 6C, then that file may be placed in a clean-up queue and subsequently removed.

Accordingly, manifests 107 may be used to determine whether additional pointers 165 that point to a particular file can be stored in cache 160. As mentioned earlier, cache 160 may be populated as a by-product of looking up a record 310. Thus, if none of the valid manifests 107 reference a particular file, then that file cannot be located through manifests 107. (Other ways may be potentially used to access that file, such a going through cache 160.) As such, in some embodiments, new pointers 165 that point to that particular file will not be added as a by-product of lookups. Manifests 107 may additionally be used to determine whether certain threads are able to access a particular file that is not referenced in valid manifests 107, but is accessible via cache 160.

Figure 7:
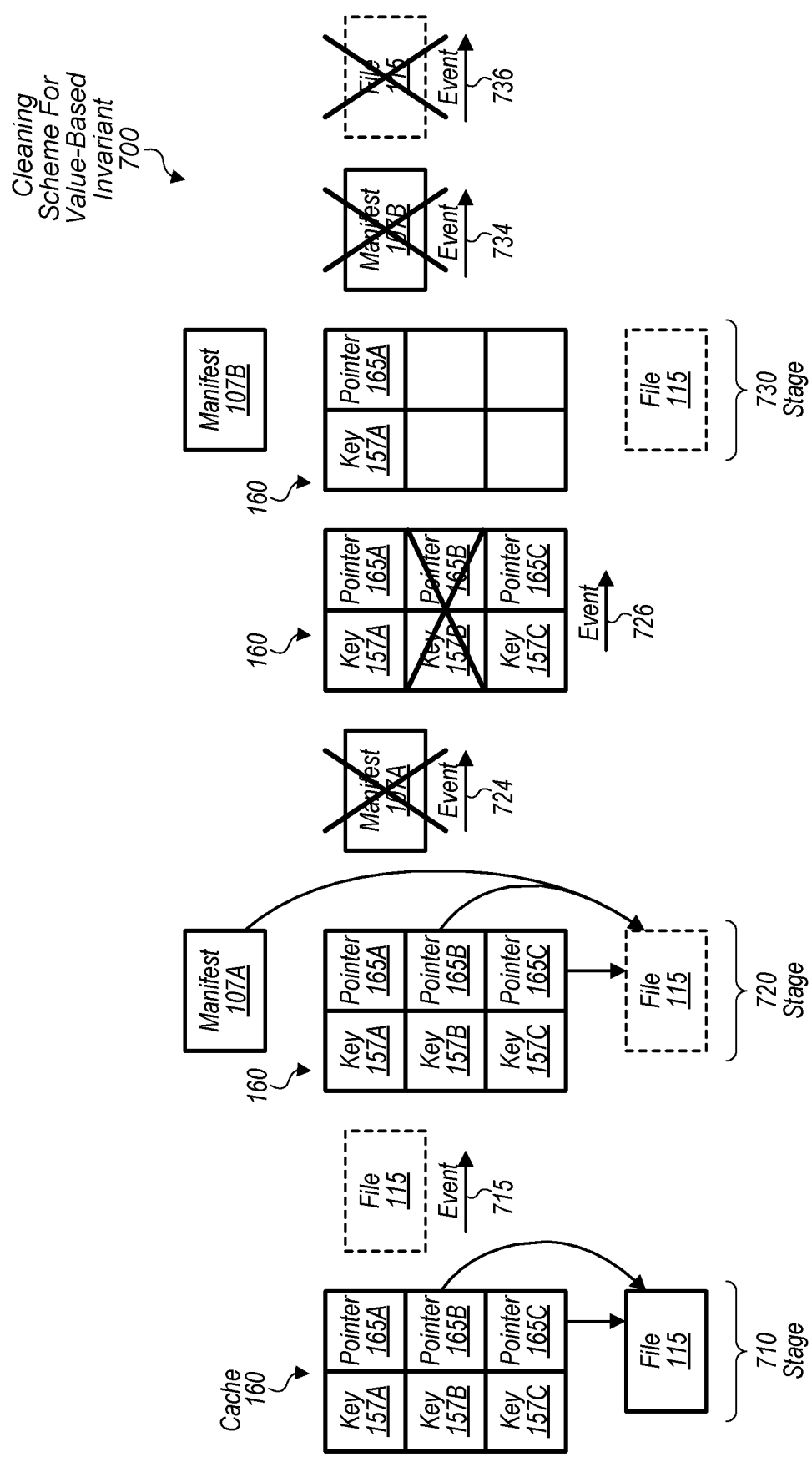
FIG. 7 is a block diagram illustrating exemplary elements of a cache invalidation scheme based on a value-based cache invariant, according to some embodiments.

Having described manifests 107 and how the value-based invariant of cache 160 may reference records in a file whose contents have been merged (while the file is retained), a cleaning scheme for removing that file is discussed in reference to FIG. 7. The cleaning scheme may ensure that entries in cache 160 are properly invalidated so that they do not point to a file that has been removed. Then, an invalidation scheme for the location-based invariant of cache 160 is discussed in reference to FIG. 8.

Turning now to FIG. 7, a block diagram of a cleaning scheme used in association with the value-based invariant of cache 160 is shown. As mentioned above, cache 160 may implement a value-based invariant in which entries of cache 160 provide locations of or indicate current or non-current records 310 storing the latest version of particular data. In the illustrated embodiment, scheme 700 includes stages 710, 720, and 730 and events 715, 724, 726, 734, and 736. As shown, stage 710 includes a file 115 and a cache 160 that includes keys 157A-C and pointers 165A-C (with pointers 165B and 165C referencing file 115). As further shown, stage 720 includes file 115, a manifest 107A referencing file 115 and cache 160 having the same keys 157 and 165 as stage 710. Also as shown, stage 730 includes file 115, a manifest 107B, and cache 160 having only key 157A and pointer 165A. In various embodiments, scheme 700 is carried out as a result of the execution of routines 204, 210, 220, and 230. In some embodiments, scheme 700 may be implemented differently than shown—e.g. scheme 800 discussed with regards to FIG. 8.

Stage 710, in various embodiments, represents a point in time during the operation of system 10 at which 1) all records within file 115 has not been completely merged into new files and 2) entries of cache 160 include pointers 165B and 165C indicating different records 310 that may be found in file 115. Accordingly, at stage 710, threads implementing routines 150 may read cache 160 in order to locate the records in file 115 that are tied to pointers 165B and 165C. In various embodiments, the movement from stage 710 to stage 720 results from the occurrence of event 715. In some embodiments, event 715 represents the merging/copying (e.g., the performance of merge 410 or 430) of all the records 310 included in file 115 into new files.

Stage 720, in various embodiments, represents a point in time during the operation of system 10 at which all the records 310 included in file 115 have been completely merged into new files—e.g., all those records 310 have been written to new files in another level of tree 105. In various embodiments, manifests 107A is the last manifest 107 that indicates that file 115 exists. While file 115 has been completely merged, file 115 may be accessed through cache 160 (in particular, via pointers 165B and 165C) and through manifest 107A (and any other manifests 107 that older and reference file 115). In various embodiments, the movement from stage 720 to stage 730 results from the occurrence of events 724 and 726. In some embodiments, event 724 represents the expiration of manifest 107A—e.g., threads that were associated with manifest 107A have terminated. Accordingly, file 115 may not be accessed through manifests 107. In some embodiments, when a particular file (e.g., 115, 125, 135, etc.) cannot be accessed through manifests 107, then no new pointers 165 to that particular file can be stored in cache 160 (e.g., because cache 160 is populated as a byproduct of lookups in tree 105 that use manifests 107). Accordingly, after event 724 has occurred, in various embodiments, system 10 begins walking through cache 160 and invalidating entries that include pointers 165 specifying locations within file 115. As such, event 726 may represent entries in cache 160 being invalidated. In some embodiments, the rate at which entries are invalidated may be based on whether the alias associated with that file needs to be recycled (e.g., whether it is urgent that the alias be recycled).

Stage 730, in various embodiments, represents a point in time during the operation of system 10 at which all the records 310 included in file 115 have been completely merged and all the entries in cache 160 that included pointers 165 that indicated file 115 have been invalidated. In some embodiments, manifests 107B is the last manifest 107 created before all the entries in cache 160 that pointed to file 115 had been invalidated. As such, manifest 107B may be associated with threads that have accessed cache 160 and retrieved pointers 165. Accordingly, such threads may access file 115 during their lifespan via the retrieved pointers 165. In some embodiments, event 734 represents the expiration of manifest 107B and thus the termination of threads associated with manifest 107B. In some embodiments, event 736 represents the deletion (or removal) of file 115. That is, in various embodiments, system 10 ensures that there are no in-progress threads that are capable of reading file 115 by waiting for manifest 107B to expire. Accordingly, after manifest 107B expires, system 10 may safely remove file 115 without an error occurring because there is a thread that can read file 115. Accordingly, scheme 700 may serve as a mechanism for removing files (e.g., 115, 125, 135, etc.) from database 100 while also ensuring that cache 160 does not include valid entries pointing to files that have been removed.

Figure 8:
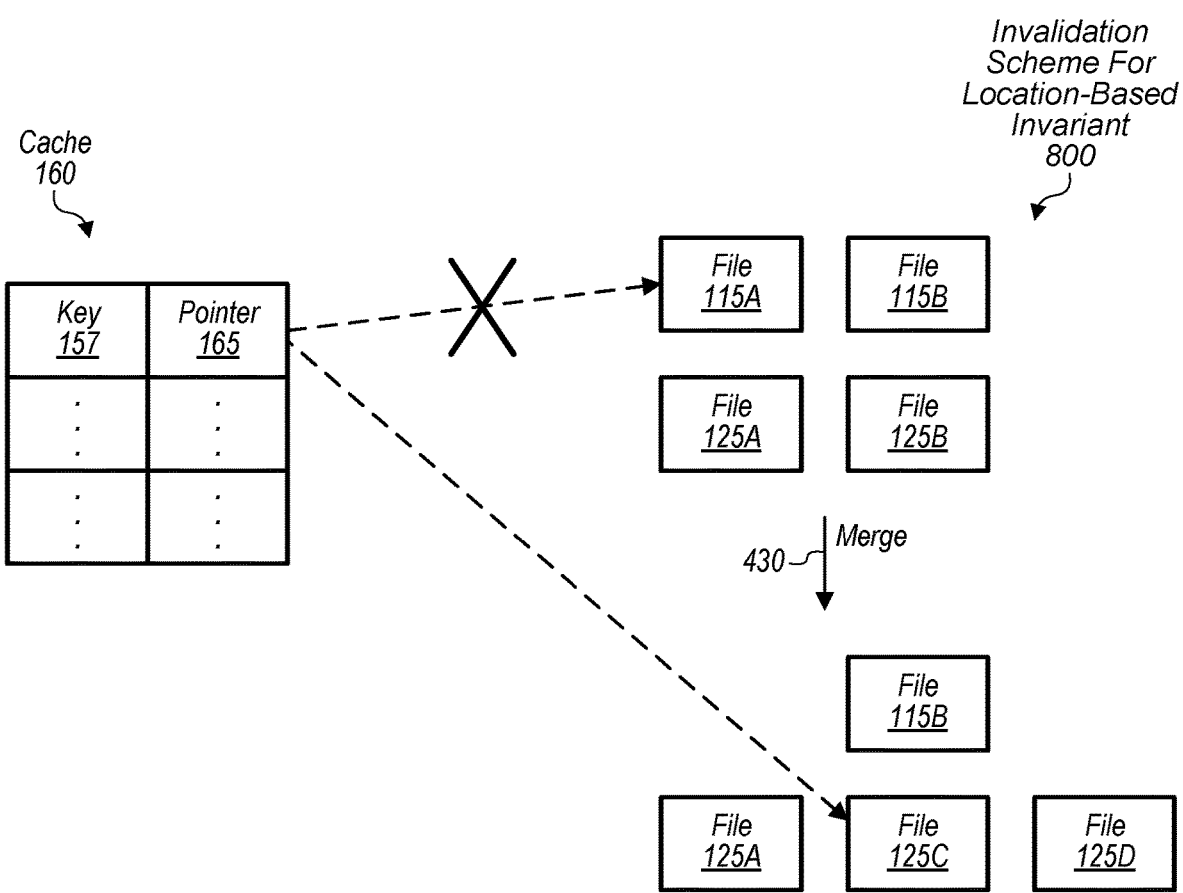
FIG. 8 is a block diagram illustrating exemplary elements of a cache invalidation scheme based on location-based cache invariant, according to some embodiments.

Turning now to FIG. 8, a block diagram of an invalidation scheme used on cache 160 is shown. As mentioned above, cache 160 may implement a location-based invariant in which entries of cache 160 provide locations of or indicate current records 310 storing the latest version of particular data. In the illustrated embodiment, scheme 800 includes a before- and after merge 430 and cache 160 having a key 157 and a corresponding pointer 165. As shown in the before merge 430 (depicted above merge 430), files 115A and 115B reside in a level 110 and files 125A and 125B reside in a level 120. As shown in the after merge 430 (depicted below merge 430), file 115B resides in level 110 and files 125A and 125C-D reside in level 120. While merge 430 is shown, in various embodiments, merge 410 is performed instead of merge 430.

As shown, pointer 165 may initially indicate a particular record 310 in file 115A of level 110. At some point, a merge 430 may performed in which a key range 420 includes the key associated with the particular record 310. Accordingly, as shown, merge 430 may result in file 125C being created that includes a copy of the particular record 310. In some embodiments, server 140 invalidates the pointer 165 corresponding to that particular record 310 in response to that record being merged into another level. In some embodiments, server 140 invalidates that pointer 165 by replacing it with another pointer 165 that points to the particular record that is included in file 125C.

Figure 9:
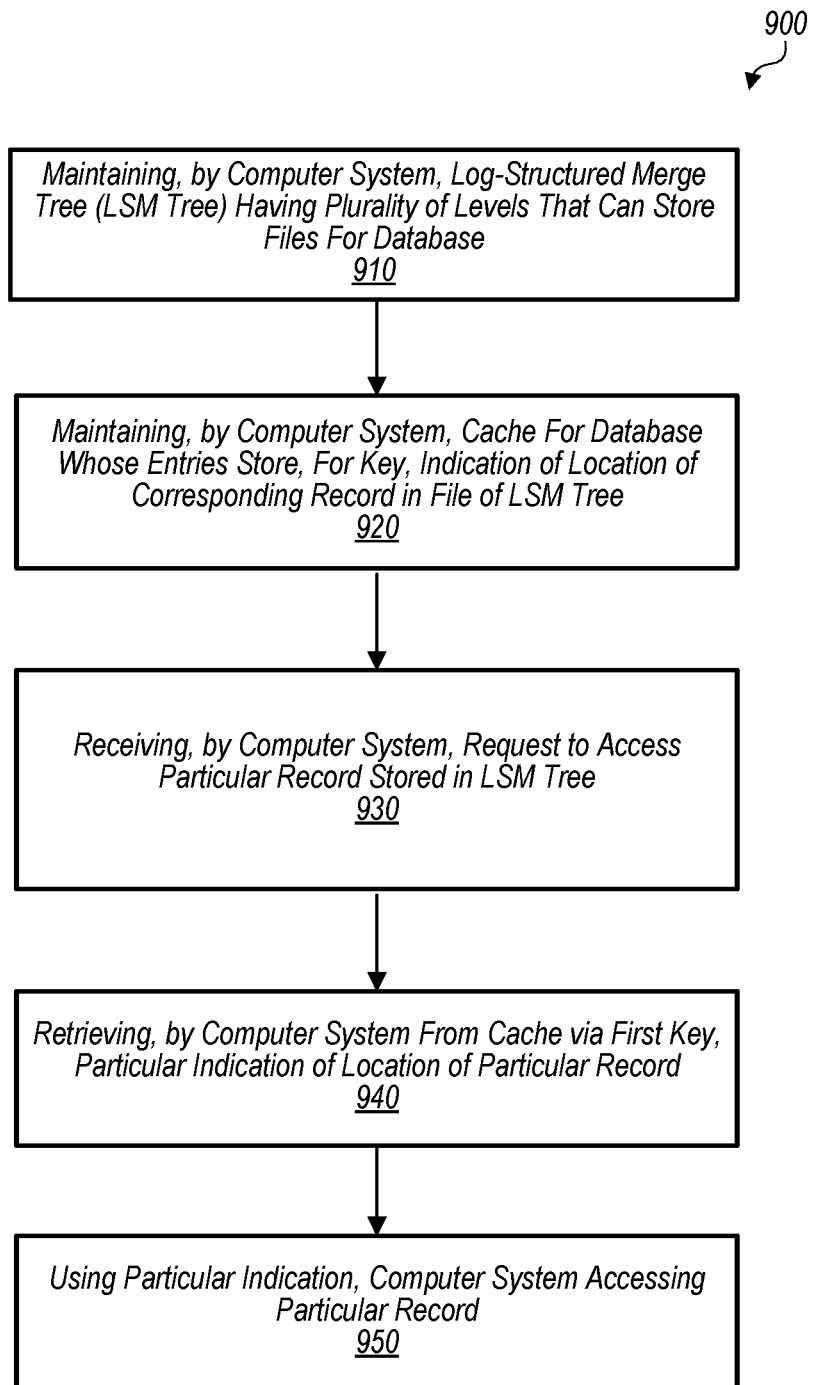
FIG. 9-11 are flow diagrams illustrating exemplary methods relating to maintaining a cache, according to some embodiments.

Turning now to FIG. 9, a flow diagram of a method 900 is shown. Method 900 is one embodiment of a method performed by a computer system (e.g., database system 10) for maintaining a cache (e.g., cache 160) usable to locate data (e.g., records 310) stored in a log-structured merge tree (LSM tree) (e.g., tree 105). Method 900 may be performed by executing program instructions that implement routines 204, 210, 220, and 230. In method 900, cache 160 may implement the value-based variant. In various embodiments, method 900 includes additional steps such as writing records (e.g., records 310) from an external source to the LSM tree.

Method 900 begins in step 910 with a computer system maintaining a LSM tree having a plurality of levels (e.g., levels 110, 120, 130, etc.) that can store files (e.g., files 115, 125, 135, etc.) for a database (e.g., database 100). In various embodiments, the files include one or more records (e.g., records 310) that each have a key and corresponding data. In various embodiments, the computer system maintains a plurality of manifests (e.g., manifests 107) that individually identify files in a particular level of the LSM tree at a particular point in time.

In step 920, the computer system maintains a cache for the database whose entries store, for a key (e.g., key 157), an indication (e.g., pointer 165) of a location of a corresponding record in a file of the LSM tree. The computer system may execute atomic store instructions to store indications in entries of the cache. In some embodiments, the computer system stores an additional file in the LSM tree that includes a set of keys and corresponding data. Subsequent to storing the additional file, the computer system may invalidate entries in the cache that have a key included in the set of keys.

In step 930, the computer system receives a request to access a particular record stored in the LSM tree. The request may specify a first key usable to locate the particular record. In step 940, the computer system retrieves, from the cache via the first key, a particular indication of a location of the particular record. In some embodiments, the particular indication is stored in the cache using the second key. The computer system may determine the second key by scanning an index structure using the first key. In step 950, the computer system accesses the particular record using the particular indication.

In various embodiments, the computer system copies (e.g., merge 410 or 430) a particular file from a first level in the LSM tree to a second level. The copying may be performed in response to a storage threshold for the first level being reached. Subsequent to the copying, in some embodiments, the computer system deletes the particular file from the first level upon determining that entries in the cache that store an indication of a location within the particular file have been invalidated and upon determining that no in-progress threads reading the LSM tree can access the particular file. One of the plurality of manifests maintained by the computer system may identify the particular file. In some embodiments, subsequent to none of the plurality of manifests identifying the particular file, the computer system invalidate entries in the cache that store an indication of a location within the particular file. After determining that entries storing an indication of a location within the particular file have been invalidated, the computer system may maintain a particular manifest that is associated with one or more in-progress threads. In some cases, the expiration of that particular manifest may indicate that no in-progress threads reading the LSM tree can access the particular file.

Figure 10:
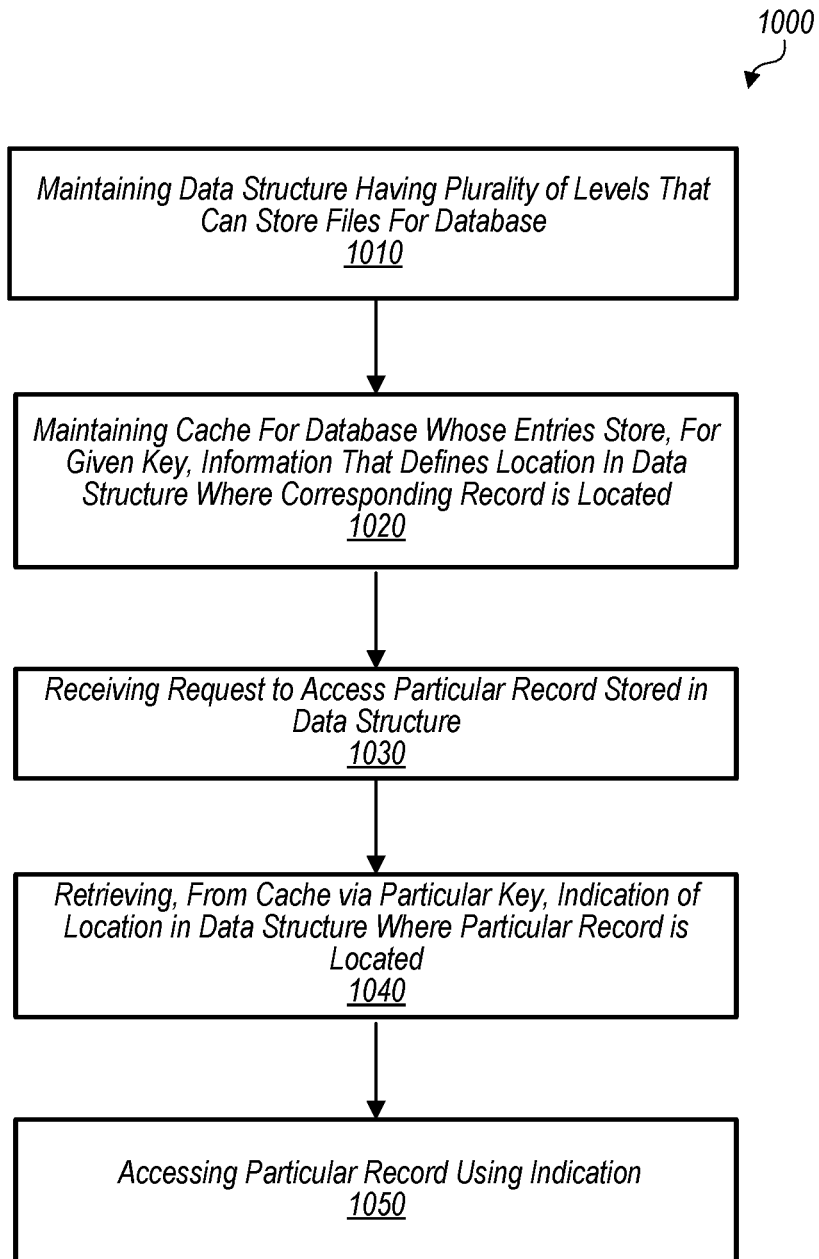

Turning now to FIG. 10, a flow diagram of a method 1000 is shown. Method 1000 is one embodiment of a method performed by a computer system (e.g., database system 10) for maintaining a cache (e.g., cache 160) usable to locate data (e.g., records 310) stored in a data structure (e.g., tree 105). Method 1000 may be performed by executing program instructions that implement routines 204, 210, 220, and 230. In method 1000, cache 160 may implement the value-based variant discussed above. In various embodiments, method 1000 includes additional steps such the computer system storing indications (e.g., pointers 165) of locations in entries of the cache using atomic store instructions.

Method 1000 begins in step 1010 with a computer system maintaining a data structure having a plurality of levels (e.g., levels 110, 120, 130, etc.) that store files (e.g., files 115, 125, 135, etc.) for a database (e.g., database 100). The files may include one or more records (e.g., records 310) that each include a key and corresponding data. In some embodiments, the computer system maintains one or more manifests (e.g., manifest 107) that specify, for a given level of the data structure, files that are included in that given level. In some embodiments, the computer system maintains a map that associates aliases with files (e.g., file names).

In step 1020, the computer system maintains a cache for the database whose entries store, for a given key (e.g., key 157), information (e.g., pointer 165) that defines a location in the data structure where a corresponding record is located. The computer system, in various embodiments, receives a request for a particular record stored within the data structure. In such embodiments, the computer system may determine a location where the particular record is stored within the data structure by searching the data structure for the particular record. As such, in response to determining the location where the particular record is stored, the computer system may store particular information (e.g., pointer 165) in the cache that defines the location where the particular record is stored within the data structure. In some embodiments, the computer system writes a plurality of records from an external storage to the data structure. In response to writing the plurality of records to the data structure, the computer system may invalidate entries in the cache that are associated with keys matching keys associated with the plurality of records.

In step 1030, the computer system receives a request to access a particular record stored in the data structure. The request may specify a particular key usable to locate the particular record.

In step 1040, the computer system retrieves, from the cache via the particular key, an indication of a location in the data structure where the particular record is located. In some embodiments, the computer system stores, in a particular entry of the cache, a first indication defining a location of a first record in the data structure. The first indication may be stored based on a first, hashed key corresponding to the first record. In some embodiments, computer system overwrites, in the particular entry of the cache, the first indication with a second indication defining a location of a second record in the data structure. The second indication may be stored based on a second, hashed key corresponding to the second record and the second, hashed key may match the first, hashed key. Accordingly, the computer system may receive a request for the first record in the data structure. The computer system may perform a hash derivation function using the particular key specified in the request to derive the first, hashed key. The computer system may then retrieve, from the particular entry based on the first, hashed key, a particular indication that defines a location of a corresponding record. In some embodiments, the computer system determines that the particular indication corresponds to the second indication and is not usable to access the first record. In step 1050, the computer system accesses the particular record using the indication.

In various embodiments, the computer system writes one or more records from a file in a first level of the data structure to a new file in a second level of the data structure. Subsequently, the computer system may delete the file from the first level upon determining that entries in the cache that store information corresponding to the file have been invalidated and upon determining that no in-progress threads reading the data structure can access the file.

Figure 11:
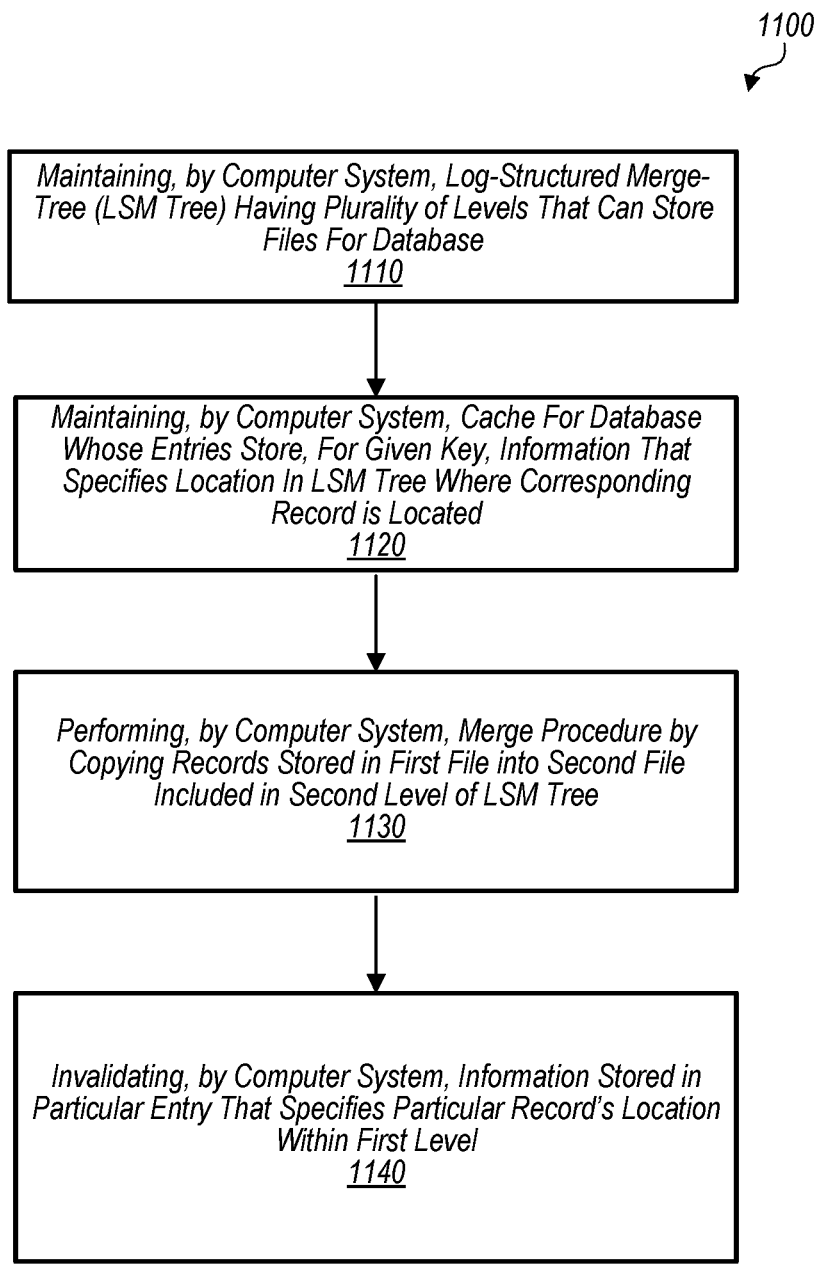

Turning now to FIG. 11, a flow diagram of a method 1100 is shown. Method 1100 is one embodiment of a method performed by a computer system (e.g., database system 10) for maintaining a cache (e.g., cache 160) usable to locate data (e.g., records 310) stored in a log-structured merge-tree (LSM tree) (e.g., tree 105). Method 1100 may be performed by executing program instructions that implement routines 204, 210, 220, and 230. In method 1100, cache 160 may implement the location-based variant discussed above. In various embodiments, method 900 includes additional steps such the computer system storing indications (e.g., pointers 165) of locations in entries of the cache using atomic store instructions.

Method 1100 beings in step 1110 with a computer system maintaining a LSM tree having a plurality of levels (e.g., levels 110, 120, 130, etc.) that store files (e.g., files 115, 125, 135, etc.) for a database (e.g., database 100). In various embodiments, the files include one or more records (e.g., records 310) that each have a key and corresponding data.

In step 1120, the computer system maintains a cache for the database whose entries store, for a given key (e.g., key 157), information (e.g., pointer 165) that specifies a location in the LSM tree where a corresponding record is located. In some cases, the cache may include a particular entry storing information that specifies a location of a particular record included in a first file that is stored in a first level of the LSM tree. In various embodiments, the computer system writes one or more records from an in-memory buffer of the computer system to the LSM tree. Accordingly, in response to writing the one or more records to the LSM tree, the computer system may invalidate entries in the cache that are associated with keys that correspond to the one or more records.

In step 1130, the computer system performs a merge procedure (e.g., merge 410 or 430) by copying records stored in the first file into a second file included in a second level of the LSM tree. In some cases, the records may include the particular record mentioned above.

In step 1140, the computer system invalidates the information stored in the particular entry that specifies the particular record's location within the first level. In some embodiments, the computer system invalidate the information by updating the information to specify the particular record's location within the second level.

Exemplary Computer System

Figure 12:
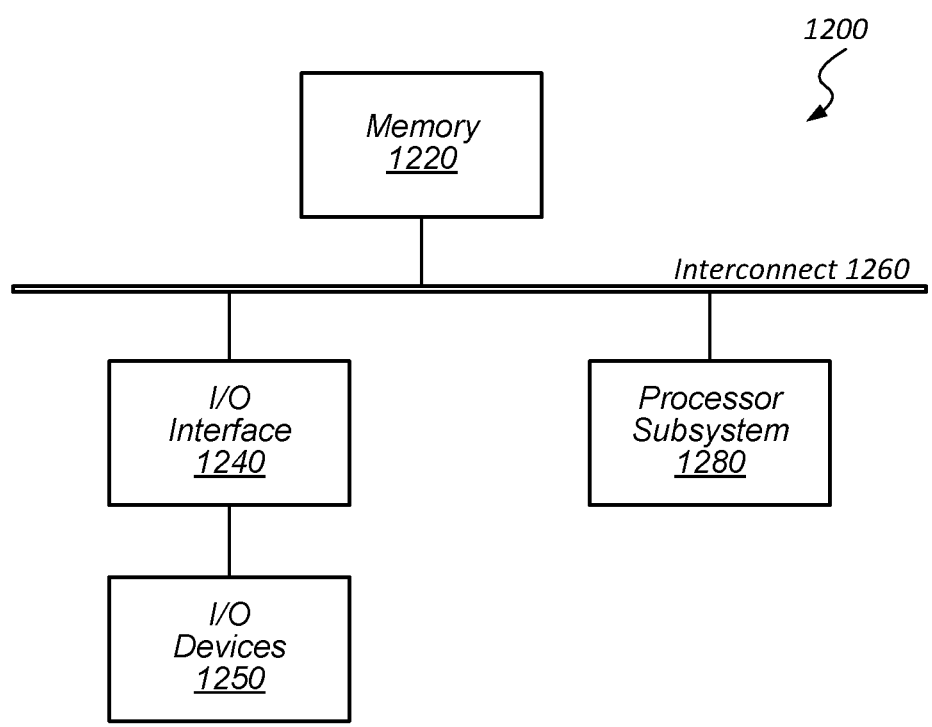
FIG. 12 is a block diagram illustrating an exemplary computer system, according to some embodiments.

Turning now to FIG. 12, a block diagram of an exemplary computer system 1200, which may implement database system 10, is depicted. Computer system 1200 includes a processor subsystem 1280 that is coupled to a system memory 1220 and I/O interfaces(s) 1240 via an interconnect 1260 (e.g., a system bus). I/O interface(s) 1240 is coupled to one or more I/O devices 1250. Computer system 1200 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1200 is shown in FIG. 12 for convenience, system 1200 may also be implemented as two or more computer systems operating together.

Processor subsystem 1280 may include one or more processors or processing units. In various embodiments of computer system 1200, multiple instances of processor subsystem 1280 may be coupled to interconnect 1260. In various embodiments, processor subsystem 1280 (or each processor unit within 1280) may contain a cache or other form of on-board memory.

System memory 1220 is usable store program instructions executable by processor subsystem 1280 to cause system 1200 perform various operations described herein. System memory 1220 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1200 is not limited to primary storage such as memory 1220. Rather, computer system 1200 may also include other forms of storage such as cache memory in processor subsystem 1280 and secondary storage on I/O Devices 1250 (e.g., a hard drive, storage array, etc.). In some embodiments, these other forms of storage may also store program instructions executable by processor subsystem 1280. In various embodiments, routines 204, 210, 220, and 230 described above may be included within system memory 1220.

I/O interfaces 1240 may be any of various types of interfaces configured to couple to and communicate with other devices, according to various embodiments. In one embodiment, I/O interface 1240 is a bridge chip (e.g., Southbridge) from a front-side to one or more back-side buses. I/O interfaces 1240 may be coupled to one or more I/O devices 1250 via one or more corresponding buses or other interfaces. Examples of I/O devices 1250 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1200 is coupled to a network via a network interface device 1250 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    maintaining, by a computer system, a log-structured merge-tree (LSM tree) and a set of manifests for accessing files in the LSM tree, wherein the LSM tree has a plurality of levels that can store the files for a database, wherein the files include one or more records that each have a key and corresponding data, and wherein each of the set of manifests specifies files included in a given level of the LSM tree at a corresponding point in time;
    maintaining, by the computer system, a cache for the database whose entries store, for a key, an indication of a location of a corresponding record in a file of the LSM tree, wherein maintaining the cache includes invalidating a given entry of the cache when a file identified by the given entry is not specified in any of the set of manifests;
    receiving, by the computer system, a request to access a particular record stored in the LSM tree, wherein the request specifies a first key usable to locate the particular record;
    retrieving, by the computer system from the cache via the first key, a particular indication of a location of the particular record; and
    using the particular indication, the computer system accessing the particular record.

2. The method of claim 1, further comprising:
    storing, by the computer system, an additional file in the LSM tree, wherein the additional file includes a set of keys and corresponding data; and
    subsequent to storing the additional file, the computer system invalidating entries in the cache that have a key included in the set of keys.

3. The method of claim 1, further comprising:
    copying, by the computer system, a particular file from a first level in the LSM tree to a second level, wherein the copying is performed in response to a storage threshold for the first level being reached;
    subsequent to the copying, the computer system deleting the particular file from the first level upon:
        determining that entries in the cache that store an indication of a location within the particular file have been invalidated; and
        determining that no in-progress threads reading the LSM tree can access the particular file.

4. The method of claim 3, wherein determining that no in-progress threads reading the LSM tree can access the particular file includes:
    after determining that entries storing an indication of a location within the particular file have been invalidated, the computer system maintaining a particular manifest that is associated with one or more in-progress threads; and
    in response to the particular manifest expiring, the computer system deleting the particular file, wherein the particular manifest expiring indicates that no in-progress threads reading the LSM tree can access the particular file.

5. The method of claim 1, wherein indications of locations are stored in entries of the cache using atomic store instructions.

6. The method of claim 1, wherein retrieving the particular indication includes:
    determining, by the computer system, a second key by scanning an index structure using the first key, wherein the particular indication is stored in the cache using the second key.

7. A non-transitory computer-readable medium having program instructions stored thereon that are capable of causing a database system to perform operations comprising:

maintaining a data structure and a set of manifests for accessing files in the data structure, wherein the data structure has a plurality of levels that store the files for a database, wherein the files include one or more records that each include a key and corresponding data, and wherein each of the set of manifests specifies files included in a given level of the data structure at a corresponding point in time;

maintaining a cache for the database whose entries store, for a given key, information that defines a location in the data structure where a corresponding record is located, wherein maintaining the cache includes invalidating a given entry of the cache when a file identified by the given entry is not specified in any of the set of manifests;

receiving a request to access a particular record stored in the data structure, wherein the request specifies a particular key usable to locate the particular record;

retrieving, from the cache via the particular key, an indication of a location in the data structure where the particular record is located; and accessing the particular record using the indication.

8. The non-transitory computer-readable medium of claim 7, wherein the operations further comprise:
receiving a request for an additional record stored within the data structure;
in response to determining that the cache does not store an indication of a location of the additional record:
determining where the particular record is stored within the data structure by searching the data structure for the particular record; and
in response to determining where the particular record is stored, storing an indication in the cache that indicates where the particular record is stored within the data structure.

9. The non-transitory computer-readable medium of claim 7, wherein the operations further comprise:
writing a plurality of records from an external storage to the data structure; and
in response to writing the plurality of records to the data structure, invalidating entries in the cache that are associated with keys matching keys associated with the plurality of records.

10. The non-transitory computer-readable medium of claim 7, wherein the operations further comprise:
writing one or more records from a file in a first level of the data structure to a new file in a second level of the data structure;
subsequent to the writing, deleting the file from the first level upon:
determining that entries in the cache that store information corresponding to the file have been invalidated; and
determining that no in-progress threads reading the data structure can access the file.

11. The non-transitory computer-readable medium of claim 7, wherein the operations further comprise:
storing, in a particular entry of the cache, a first indication defining a location of a first record in the data structure, wherein the first indication is stored based on a first hashed key corresponding to the first record; and
overwriting, in the particular entry of the cache, the first indication with a second indication defining a location of a second record in the data structure, wherein the second indication is stored based on a second hashed key corresponding to the second record, wherein the second hashed key matches the first hashed key.

12. The non-transitory computer-readable medium of claim 11, wherein the operations further comprise:
receiving a request for the first record in the data structure, wherein the request includes a certain key associated with the first record;
performing a hash derivation function using the certain key to derive the first hashed key;
retrieving, from the particular entry based on the first hashed key, a particular indication that defines a location of a corresponding record; and
determining that the particular indication corresponds to the second indication and is not usable to access the first record.

13. A method, comprising:
maintaining, by a computer system, a log-structured merge-tree (LSM tree) having a plurality of levels that store files for a database, wherein the files include one or more records that each include a key and corresponding data;
maintaining, by the computer system, a cache for the database whose entries store, for a given key, information that specifies a location in the LSM tree where a corresponding record is located, wherein the cache includes a particular entry that stores information that specifies a location of a particular record included in a first file that is stored in a first level of the LSM tree;
maintaining, by the computer system, one or more manifests that specify that the first file is stored in the first level of the LSM tree;
performing, by the computer system, a merge procedure by copying records stored in the first file into a second file included in a second level of the LSM tree, wherein the records include the particular record; and
invalidating, by the computer system, the information stored in the particular entry that specifies the particular record's location within the first level, wherein the invalidating is performed in response to determining that the one or more manifests are no longer valid.

14. The method of claim 13, wherein the invalidating includes:
updating, by the computer system, the information stored in the particular entry to specify the particular record's location within the second level.

15. The method of claim 13, further comprising:
writing, by the computer system, one or more records from an in-memory buffer of the computer system to the LSM tree; and
in response to writing the one or more records to the LSM tree, the computer system invalidating entries in the cache that are associated with keys that correspond to the one or more records.

16. The method of claim 13, further comprising:
prior to the particular entry storing information that specifies the location of the particular record in the first level, the computer system receiving a request for the particular record; and
after receiving the request, the computer system locating the particular record in the first level; and
in response to locating the particular record in the first level, the computer system storing the information that specifies the location of the particular record in the first level.

17. The method of claim 13, wherein the given key corresponding to an entry is derived by performing a hash derivation function on a key corresponding to a record whose location is being stored in the entry.

18. The method of claim 17, wherein the particular record and a different record in the LSM tree are associate with the same hashed key, and the method further comprising:
- receiving, by the computer system, a request for the particular record;
- retrieving, by the computer system, information from the cache based on a hashed key associated with the particular record;
- determining, by the computer system, whether the information specifies a location of the particular record or the different record; and
- in response to determining that the information specifies a location of the particular record, the computer system returning the particular record based on the information.

* * * * *